United States Patent
Inomata et al.

(10) Patent No.: US 11,545,924 B2
(45) Date of Patent: Jan. 3, 2023

(54) POWER CONVERSION DEVICE, POWER CONVERSION METHOD AND PROGRAM

(71) Applicant: KABUSHIKI KAISHA YASKAWA DENKI, Kitakyushu (JP)

(72) Inventors: Kentaro Inomata, Kitakyushu (JP); Akira Yamazaki, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 0 days.

(21) Appl. No.: 17/386,581

(22) Filed: Jul. 28, 2021

(65) Prior Publication Data

US 2022/0038040 A1 Feb. 3, 2022

(30) Foreign Application Priority Data

Jul. 28, 2020 (JP) .............................. JP2020-127225

(51) Int. Cl.
  *H02P 27/08* (2006.01)
  *H02P 21/14* (2016.01)

(52) U.S. Cl.
  CPC .............. *H02P 27/08* (2013.01); *H02P 21/14* (2013.01)

(58) Field of Classification Search
  CPC combination set(s) only.
  See application file for complete search history.

(56) References Cited

U.S. PATENT DOCUMENTS 9,054,630 B2 * 6/2015 Kobayashi ............ H02P 21/141

FOREIGN PATENT DOCUMENTS

JP            4228651 B2     2/2009

* cited by examiner

*Primary Examiner* — Antony M Paul
(74) *Attorney, Agent, or Firm* — Oblon, McClelland, Maier & Neustadt, L.L.P.

(57) ABSTRACT

A power conversion device includes processing circuitry that estimates a magnet magnetic flux of an electric motor based on a d-axis magnetic flux generated in the electric motor, a d-axis inductance of the electric motor, and a d-axis current flowing in the electric motor, estimates a q-axis inductance of the electric motor based on a q-axis magnetic flux generated in the electric motor and a q-axis current flowing in the electric motor, estimates a drive force of the electric motor based on the magnet magnetic flux and the q-axis inductance, and corrects a current command such that the drive force follows a drive force command.

20 Claims, 12 Drawing Sheets

POWER CONVERSION DEVICE, POWER CONVERSION METHOD AND PROGRAM

CROSS-REFERENCE TO RELATED APPLICATIONS

The present application is based upon and claims the benefit of priority to Japanese Patent Application No. 2020-127225, filed Jul. 28, 2020, the entire contents of which are incorporated herein by reference.

BACKGROUND OF THE INVENTION

Field of the Invention

The present disclosure relates to a power conversion device, a power conversion method and a program.

Description of Background Art

Japanese Patent No. 4228651 describes a control method in which an armature rotating magnetic field and a rotor speed of an IPM motor are controlled using a rotor magnetic pole position estimation signal and a rotor speed estimation signal which are obtained by calculation from an internal signal of a control device of the IPM motor. The entire contents of this publication are incorporated herein by reference.

SUMMARY OF THE INVENTION

According to one aspect of the present invention, a power conversion device includes processing circuitry that estimates a magnet magnetic flux of an electric motor based on a d-axis magnetic flux generated in the electric motor, a d-axis inductance of the electric motor, and a d-axis current flowing in the electric motor, estimates a q-axis inductance of the electric motor based on a q-axis magnetic flux generated in the electric motor and a q-axis current flowing in the electric motor, estimates a drive force of the electric motor based on the magnet magnetic flux and the q-axis inductance, and corrects a current command such that the drive force follows a drive force command.

According to another aspect of the present invention, a power conversion device includes processing circuitry that estimates an ineffective force, which is an inner product of a vector of a magnetic flux generated in an electric motor and a vector of a current flowing in the electric motor, based on a voltage applied to the electric motor and the current flowing in the electric motor in response to application of the voltage, calculates an angular error of a dq coordinate system based on the ineffective force, estimates a drive force of the electric motor based on the angular error, and corrects a current command such that the drive force follows a drive force command.

According to yet another aspect of the present invention, a power conversion device includes processing circuitry that estimates a d-axis inductance of an electric motor based on a d-axis magnetic flux generated in the electric motor and a d-axis current flowing in the electric motor, estimates a q-axis inductance of the electric motor based on a q-axis magnetic flux generated in the electric motor and a q-axis current flowing in the electric motor, estimates a drive force of the electric motor based on the d-axis inductance and the q-axis inductance, and corrects a current command such that the drive force follows a drive force command.

According to still another aspect of the present invention, a power conversion method includes estimating a magnet magnetic flux of an electric motor based on a d-axis magnetic flux generated in the electric motor, a d-axis inductance of the electric motor, and a d-axis current flowing in the electric motor, estimating a q-axis inductance of the electric motor based on a q-axis magnetic flux generated in the electric motor and a q-axis current flowing in the electric motor, estimating a drive force of the electric motor based on the magnet magnetic flux and the q-axis inductance, and correcting a current command such that the drive force follows a drive force command.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
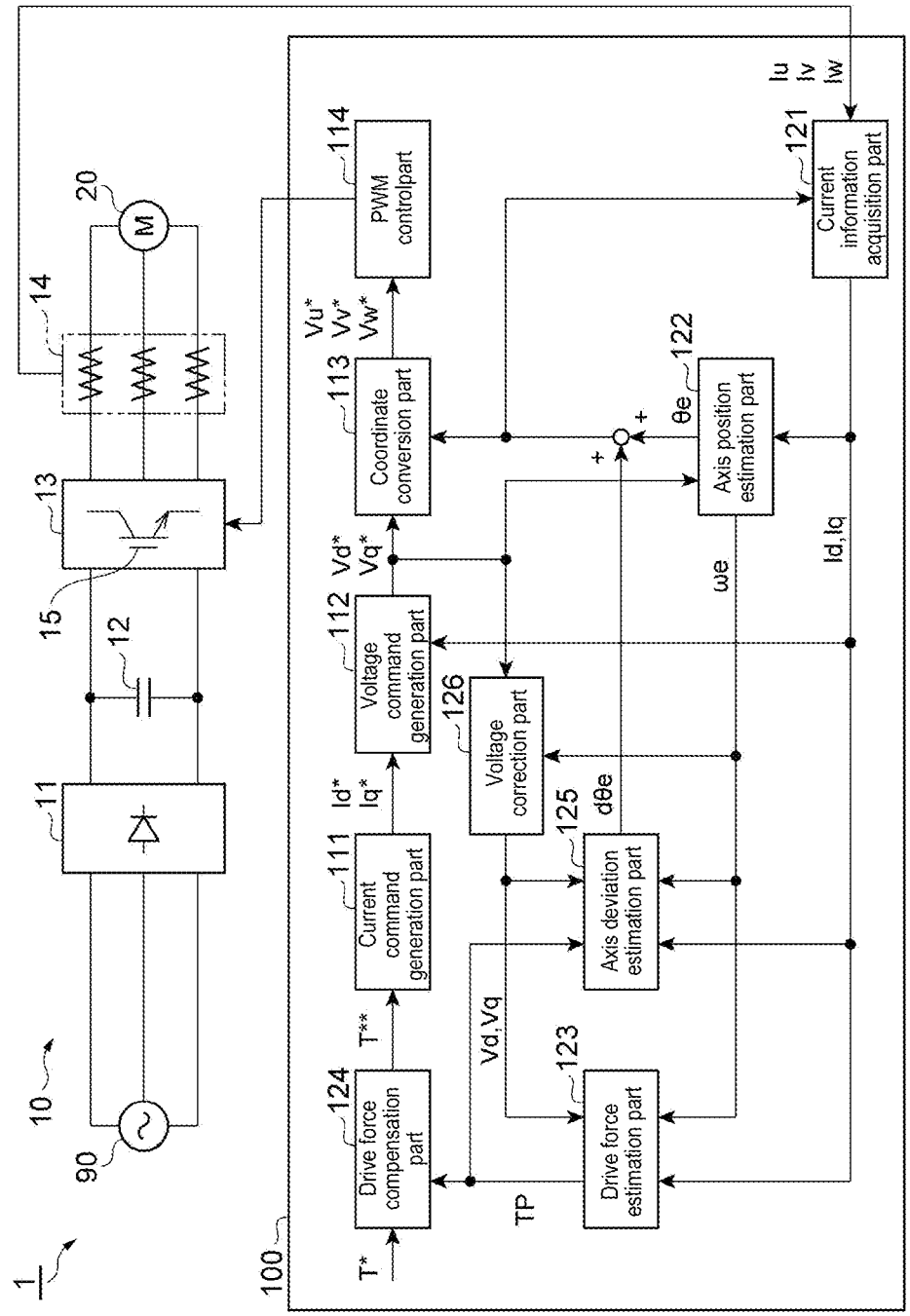
FIG. 1 is a schematic diagram illustrating a structure of a power conversion device.

Embodiments will now be described with reference to the accompanying drawings, wherein like reference numerals designate corresponding or identical elements throughout the various drawings.

Power Conversion Device

A power conversion device 1 according to an embodiment of the present invention is a device that supplies drive power to a motor 20 (electric motor). The motor 20 is, for example, a synchronous electric motor, and drives a driven object. An object to be driven by the motor 20 is not particularly limited. However, an example thereof is a pump or the like. Specific examples of synchronous electric motors include a permanent magnet type synchronous electric motor, a synchronous reluctance motor, and the like. Specific examples of permanent magnet type synchronous electric motors include an SPM (Surface Permanent Magnet) motor, an IPM (Interior Permanent Magnet) motor, and the like.

As illustrated in FIG. 1, the power conversion device 1 converts power of a power supply 90 (primary-side power)

into drive power (secondary-side power) and supplies the drive power to the motor 20. The primary-side power may be AC power or DC power. The secondary-side power is AC power. As an example, the primary-side power and the secondary-side power are both three-phase AC power. For example, the power conversion device 1 includes a power conversion circuit 10 and a control circuit 100.

The power conversion circuit 10 converts the primary-side power into the secondary-side power and supplies the secondary-side power to the motor 20. The power conversion circuit 10 is, for example, a voltage type inverter, and applies a drive voltage according to a voltage command to the motor 20. For example, the power conversion circuit 10 includes a converter circuit 11, a smoothing capacitor 12, an inverter circuit 13, and a current sensor 14.

The converter circuit 11 is, for example, a diode bridge circuit or a PWM converter circuit, and converts the above power-supply power into DC power. The smoothing capacitor 12 smooths the above DC power. The inverter circuit 13 performs power conversion between the above DC power and the above drive power. For example, the inverter circuit 13 has multiple switching elements 15 and performs the above power conversion by switching the multiple switching elements 15 on or off. The switching elements are each, for example, a power MOSFET (Metal Oxide Semiconductor Field Effect Transistor) or an IGBT (Insulated Gate Bipolar Transistor), and each switch on or off according to a gate drive signal.

The current sensor 14 detects a current flowing between the inverter circuit 13 and the motor 20. For example, the current sensor 14 may be structured to detect currents of all phases (U-phase, V-phase and W-phase) of a three-phase alternating current, or may be structured to detect currents of any two phases of a three-phase alternating current. Unless a zero-phase current is generated, a sum of U-phase, V-phase and W-phase currents is zero, and thus, even when currents of two phases are detected, information about currents of all phases is obtained.

The structure of the power conversion circuit 10 described above is merely an example, and can be modified in any way as long as drive power can be supplied to the motor 20. For example, the power conversion circuit 10 may be a current type inverter. A current type inverter outputs a drive current according to a current command to the motor 20. The power conversion circuit 10 may be a matrix converter circuit that performs bidirectional power conversion between power-supply power and drive power without undergoing DC electrification. When the power-supply power is DC power, the power conversion circuit 10 does not have to have the converter circuit 11.

The control circuit 100 controls the power conversion circuit 10 to supply drive power to the motor 20. For example, the control circuit 100 adjusts the drive power by the power conversion circuit 10 such that a drive force (for example, a torque) generated by the motor 20 follows a drive force command (for example, a torque command). For example, when the power conversion circuit 10 is a voltage type inverter, the control circuit 100 generates a current command based on the drive force command, generates a voltage command based on the current command, and controls the power conversion circuit 10 to supply a drive voltage according to the voltage command to the motor 20. When the power conversion circuit 10 is a current type inverter, the control circuit 100 generates a current command based on the drive force command and controls the power conversion circuit 10 to supply a drive current according to the current command to the motor 20.

Here, in an installation environment of the motor 20, a relationship between a current supplied to the motor 20 and a drive force generated by the motor 20 may be unstable, and accuracy of the drive force may decrease. For example, when the motor 20 drives an oil pump in deep underground, a drive force may significantly deviate from a drive force command due to heat generated by the motor 20.

On the other hand, the control circuit 100 is structured to execute: estimating a magnet magnetic flux of the motor 20 based on a d-axis magnetic flux generated in the motor 20, a d-axis inductance of the motor 20, and a d-axis current flowing in the motor 20; estimating a q-axis inductance of the motor 20 based on a q-axis magnetic flux generated in the motor 20, and a q-axis current flowing in the motor 20; estimating a drive force of the motor 20 based on an estimation result of the magnet magnetic flux and an estimation result of the q-axis inductance; and correcting a current command such that the estimation result of the drive force follows a drive force command. According to this structure, a magnet magnetic flux and a q-axis inductance, which tend to fluctuate depending on a state of the motor 20, are estimated based on a current state of the motor 20, a drive force is estimated based on an estimation result, and a current command is corrected such that an estimation result of the drive force follows a drive force command. Therefore, it is effective in improving accuracy of drive force control of the motor 20. In the following, the structure of the control circuit 100 in the case where the power conversion circuit 10 is a voltage type inverter is more specifically illustrated.

Overall Structure of Control Circuit

As illustrated in FIG. 1, the control circuit 100 includes, as functional components (hereinafter, referred to as "functional blocks"), a current command generation part 111, a voltage command generation part 112, a coordinate conversion part 113, a PWM control part 114, a current information acquisition part 121, an axis position estimation part 122, a drive force estimation part 123, a drive force compensation part 124, and an axis deviation estimation part 125.

The current command generation part 111 generates a current command based on a torque command (T*). The torque command (T*) is generated by the control circuit 100, for example, such that a speed of the motor 20 follows a target speed. The current command generation part 111 may acquire the torque command (T*) from an upper controller of the power conversion device 1.

For example, the current command generation part 111 generates a d-axis current command (Id*) and a q-axis current command (Iq*). The d-axis and the q-axis are coordinate axes of a dq coordinate system. The dq coordinate system is a coordinate system that rotates with a rotor of the motor 20. The d-axis is a coordinate axis along a magnetic pole direction of the rotor of the motor 20, and the q-axis is a coordinate axis perpendicular to the d-axis. A rotation angle of the dq coordinate system is expressed as an electrical angle with respect to an αβ coordinate system fixed to a stator of the motor 20. The αβ coordinate system has an α-axis and a β-axis that are perpendicular to each other. The rotation angle of the dq coordinate system is, for example, an angle of the d-axis with respect to the α-axis.

The voltage command generation part 112 generates a voltage command based on a current command. For example, the voltage command generation part 112 generates a d-axis voltage command (Vd*) and a q-axis voltage command (Vq*) based on a d-axis current command (Id*) and a q-axis current command (Iq*). For example, the voltage command generation part 112 calculates a d-axis voltage command (Vd*) and a q-axis voltage command (Vq*) based on a d-axis current command (Id*), a q-axis current command (Iq*), a d-axis current (Id), and a q-axis current (Iq) such that a deviation between the d-axis current command (Id*) and the d-axis current (Id) is reduced and a deviation between the q-axis current command (Iq*) and the q-axis current (Iq) is reduced. As will be described later, the d-axis current (Id) and the q-axis current (Iq) are acquired based on detection values of the current sensor 14.

The coordinate conversion part 113 calculates a u-phase voltage command (Vu*), a v-phase voltage command (Vv*) and a w-phase voltage command (Vw*) by performing coordinate conversion from the dq coordinate system to the αβ coordinate system and conversion from two phases to three phases with respect to a d-axis voltage command (Vd*) and a q-axis voltage command (Vq*). The PWM control part 114 switches the multiple switching elements 15 of the inverter circuit 13 on or off such that a drive voltage according to the u-phase voltage command (Vu*), the v-phase voltage command (Vv*) and the w-phase voltage command (Vw*) is applied to the motor 20.

The current information acquisition part 121 acquires detection values of the current sensor 14. The detection values include, for example, a u-phase current (Iu), a v-phase current (Iv) and a w-phase current (Iw). The current information acquisition part 121 calculates the above-described d-axis current (Id) and q-axis current (Iq) by performing conversion from three phases to two phases and coordinate conversion from the αβ coordinate system to the dq coordinate system with respect to the u-phase current (Iu), the v-phase current (Iv) and the w-phase current (Iw).

The axis position estimation part 122 estimates a rotation angle of the dq coordinate system based on a relationship between a voltage applied to the motor 20 and a current supplied to the motor 20. In a voltage type inverter, since a voltage applied to the motor 20 substantially matches a voltage command, being based on a voltage applied to the motor 20 includes being based on a voltage command. For example, the axis position estimation part 122 estimates a rotation angle (θe) of the dq coordinate system based on a relationship between the d-axis voltage command (Vd*) and q-axis voltage command (Vq*) and the d-axis current (Id) and q-axis current (Iq).

The axis position estimation part 122 may estimate a rotation angle (θe) of the dq coordinate system using a high-frequency superimposition method, or may estimate the rotation angle (θe) of the dq coordinate system using an extended induced voltage observer method. The high-frequency superimposition method is a method in which the rotation angle (θe) is estimated based on a relationship between a high-frequency component superimposed on a voltage command and a high-frequency component of a corresponding current. The extended induced voltage observer method is a method in which the rotation angle (θe) is estimated based on a direction of an induced voltage vector calculated based on a relationship between a voltage command and a current. The rotation angle (θe) is used in the above coordinate conversion in the coordinate conversion part 113 and the current information acquisition part 121.

The drive force estimation part 123 estimates a torque generated by the motor 20 based on a voltage applied to the motor 20, a current supplied to the motor 20, and a rotational angular speed of the dq coordinate system. For example, the drive force estimation part 123 estimates a torque (TP) based on a d-axis voltage command (Vd*) and a q-axis voltage command (Vq*), a d-axis current (Id) and a q-axis current (Iq), and a rotational angular speed (ωe) of the dq coordinate system. The rotational angular speed (θe) is derived, for example, by differentiating the rotation angle (θe) estimated by the axis position estimation part 122.

The drive force compensation part 124 corrects a current command such that an estimation result by the drive force estimation part 123 follows a drive force command. For example, the drive force compensation part 124 calculates a correction torque command (T**) such that a deviation between the torque (TP) estimated by the drive force estimation part 123 and the torque command (T*) is reduced, and outputs the correction torque command (T**) to the current command generation part 111. The current command generation part 111 generates a d-axis current command (Id*) and a q-axis current command (Iq*) based on the correction torque command (T**). The drive force compensation part 124 corrects the torque command (T*) to the correction torque command (T**), and thereby, a current command generated by the current command generation part 111 is corrected such that the torque (TP) follows the torque command (T*).

The axis deviation estimation part 125 estimates an angular error of the dq coordinate system based on a d-axis voltage and a q-axis voltage applied to the motor 20 and a d-axis current and a q-axis current flowing in the motor 20 in response to the application of the d-axis voltage and the q-axis voltage. The angular error is an error of the rotation angle (θe) calculated by the axis position estimation part 122. For example, the axis deviation estimation part 125 estimates an angular error (dθe) of the dq coordinate system based on a d-axis voltage command (Vd*) and a q-axis voltage command (Vq*), and a d-axis current (Id) and a q-axis current (Iq).

The angular error (dθe) is added to the rotation angle (θe) and is used together with the rotation angle (θe) in the above coordinate conversion in the coordinate conversion part 113 and the current information acquisition part 121. By using the angular error (dθe) in the coordinate conversion in the coordinate conversion part 113, the d-axis voltage command (Vd*) and the q-axis voltage command (Vq*) represent a d-axis voltage and a q-axis voltage in the dq coordinate system that has been corrected based on the angular error (dθe). In the following, the dq coordinate system that has been corrected based on the angular error (dθe) is referred to as a "compensated dq coordinate system."

By using the angular error (dθe) in the coordinate conversion in the current information acquisition part 121, a q-axis current (Iq) and a d-axis current (Id) in the compensated dq coordinate system are calculated. In this way, the d-axis voltage command (Vd*) and the q-axis voltage command (Vq*) represent a d-axis voltage and a q-axis voltage in the compensated dq coordinate system, and the d-axis current (Id) and the q-axis current (Iq) represent a d-axis current and a q-axis current in the compensated dq coordinate system. Therefore, the drive force estimation part 123, which estimates the torque (TP) based on these, estimates the torque (TP) further based on the angular error (dθe).

In the actual control circuit 100, an output delay of the generated d-axis voltage command (Vd*) and q-axis voltage command (Vq*) may occur. In this case, a deviation may occur between the d-axis voltage and q-axis voltage actually applied to the motor 20 and the d-axis voltage command (Vd*) and q-axis voltage command (Vq*). In order to compensate for this deviation, the control circuit 100 may further include a voltage correction part 126.

The voltage correction part 126 compensates for the above delay based on the rotational angular speed (ωe). For example, the voltage correction part 126 calculates a d-axis voltage (Vd) and a q-axis voltage (Vq) based on the rotational angular speed (ωe), the d-axis voltage command (Vd*) and the q-axis voltage command (Vq*). As described above, the d-axis voltage command (Vd*) and the q-axis voltage command (Vq*) represent a d-axis voltage and a q-axis voltage in the compensated dq coordinate system. Therefore, the d-axis voltage (Vd) and the q-axis voltage (Vq) calculated by the voltage correction part 126 also represent a d-axis voltage and a q-axis voltage in the compensated dq coordinate system.

When the control circuit 100 includes the voltage correction part 126, the axis deviation estimation part 125 may estimate the angular error (dθe) based on the d-axis voltage (Vd) and the q-axis voltage (Vq) calculated by the voltage correction part 126. Further, the drive force estimation part 123 may estimate the torque (TP) based on the d-axis voltage (Vd) and the q-axis voltage (Vq) calculated by the voltage correction part 126.

Drive Force Estimation Part

Figure 2:
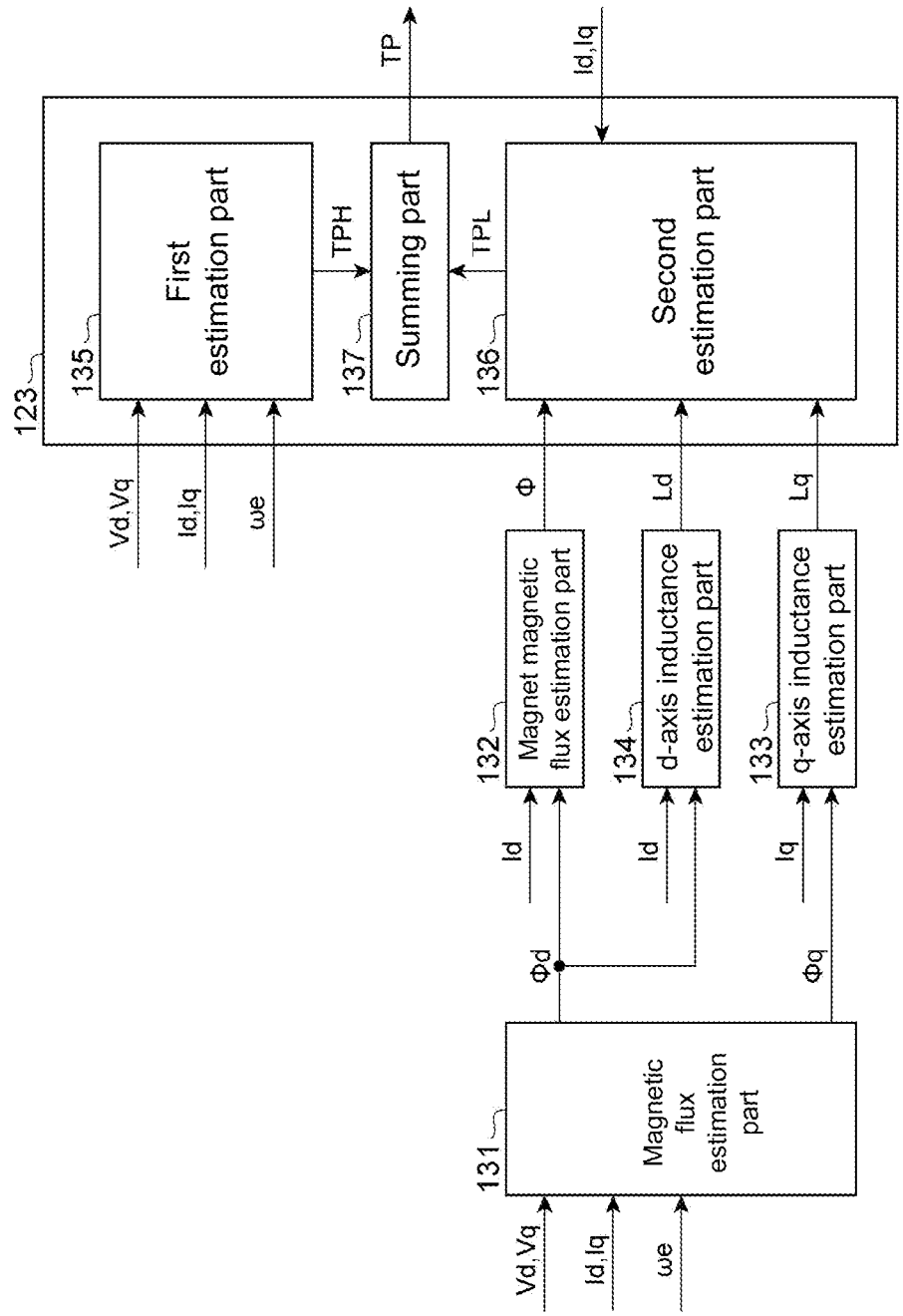
FIG. 2 is a block diagram illustrating a structure of a drive force estimation part.

Next, a structure of the drive force estimation part 123 is illustrated in more detail. The drive force estimation part 123 estimates the torque (TP) based on an estimation result of a magnet magnetic flux of the motor 20 and an estimation result of a q-axis inductance of the motor 20. For example, as illustrated in FIG. 2, the control circuit 100 further includes a magnetic flux estimation part 131, a magnet magnetic flux estimation part 132, and a q-axis inductance estimation part 133.

The magnetic flux estimation part 131 estimates a d-axis magnetic flux and a q-axis magnetic flux, which are generated in the motor 20, based on a d-axis voltage and a q-axis voltage, which are applied to the motor 20, a d-axis current and a q-axis current, which flow in the motor 20 in response to the application of the d-axis voltage and the q-axis voltage, and an operating speed of the motor 20. The d-axis magnetic flux is a magnetic flux along the d-axis, and the q-axis magnetic flux is a magnetic flux along the q-axis. For example, the magnetic flux estimation part 131 calculates a d-axis magnetic flux (Φd) and a q-axis magnetic flux (Φq) according to the following formulas based the d-axis voltage (Vd) and the q-axis voltage (Vq), which are calculated by the voltage correction part 126, and the d-axis current (Id) and the q-axis current (Iq), which are calculated by the current information acquisition part 121.

$$\Phi d = (Vq - R \cdot Iq)/\omega e \quad (1)$$

$$\Phi q = -(Vd - R \cdot Id)/\omega e \quad (2)$$

R: coil resistance of the motor 20

As described above, the d-axis voltage (Vd) and the q-axis voltage (Vq) represent a d-axis voltage and a q-axis voltage in the compensated dq coordinate system. Further, the d-axis current (Id) and the q-axis current (Iq) represent a d-axis current and a q-axis current in the compensated dq coordinate system. Therefore, the d-axis magnetic flux (Φd) and the q-axis magnetic flux (Φq) represent a d-axis magnetic flux and a q-axis magnetic flux in the compensated dq coordinate system.

The magnet magnetic flux estimation part 132 estimates a magnet magnetic flux of the motor 20 based on a d-axis magnetic flux generated in the motor 20, a d-axis inductance of the motor 20, and a d-axis current flowing in the motor 20. The d-axis inductance represents a relationship between time variation of the d-axis current and a d-axis voltage. For example, the magnet magnetic flux estimation part 132 estimates a magnet magnetic flux (Φ) according to the following formula based on the d-axis magnetic flux (Φd) estimated by the magnetic flux estimation part 131, a constant d-axis inductance (Ld), and the d-axis current (Id) calculated by the current information acquisition part 121.

$$\Phi = \Phi d - Ld \cdot Id \quad (3)$$

As described above, the d-axis magnetic flux (Φd) represents a d-axis magnetic flux in the compensated dq coordinate system. The d-axis current (Id) represents a d-axis current in the compensated dq coordinate system. Therefore, the magnet magnetic flux estimation part 132 estimates the magnet magnetic flux (Φ) based on the d-axis magnetic flux, the d-axis inductance and the d-axis current in the compensated dq coordinate system.

The q-axis inductance estimation part 133 estimates a q-axis inductance of the motor 20 based on a q-axis magnetic flux generated in the motor 20 and a q-axis current flowing in the motor 20. The q-axis inductance represents a relationship between time variation of the q-axis current and a q-axis voltage. For example, the q-axis inductance estimation part 133 estimates a q-axis inductance (Lq) according to the following formula based on the q-axis magnetic flux (Φq) estimated by the magnetic flux estimation part 131, and the q-axis current (Φq) calculated by the current information acquisition part 121.

$$Lq = \Phi q / Iq \quad (4)$$

As described above, the q-axis magnetic flux (Φq) represents a q-axis magnetic flux in the compensated dq coordinate system. The q-axis current (Iq) represents a q-axis current in the compensated dq coordinate system. Therefore, the q-axis inductance estimation part 133 estimates the q-axis inductance (Lq) based on the q-axis magnetic flux and the q-axis current in the compensated dq coordinate system.

The drive force estimation part 123 estimates the torque (TP) based on an estimation result of the magnet magnetic flux estimation part 132 and an estimation result of the q-axis inductance estimation part 133. For example, the drive force estimation part 123 estimates the torque (TP) based on the d-axis current (Id) and the q-axis current (Iq) calculated by the current information acquisition part 121, the estimation result of the magnet magnetic flux estimation part 132, and the estimation result of the q-axis inductance estimation part 133.

As described above, the d-axis current (Id) and the q-axis current (Iq) represent a d-axis current and a q-axis current in the compensated dq coordinate system. The magnet magnetic flux (Φ) estimated by the magnet magnetic flux estimation part 132 represents a magnet magnetic flux in the compensated dq coordinate system. The q-axis inductance (Lq) estimated by the q-axis inductance estimation part 133 represents a q-axis inductance in the compensated dq coordinate system. Therefore, the drive force estimation part 123 estimates the torque (TP) based on the d-axis current, the q-axis current, the magnet magnetic flux and the q-axis inductance in the compensated dq coordinate system.

The drive force estimation part 123 may be structured to estimate the torque (TP) by using in combination a first estimation method and a second estimation method, the first estimation method being not based on the estimation result of the magnet magnetic flux estimation part 132 and the estimation result of the q-axis inductance estimation part 133, and the second estimation method being based on the estimation result of the magnet magnetic flux estimation part 132 and the estimation result of the q-axis inductance estimation part 133. For example, the drive force estimation part 123 includes a first estimation part 135, a second estimation part 136, and a summing part 137.

The first estimation part 135 calculates a first torque estimation value using the above first estimation method. For example, the first estimation part 135 calculates a first torque estimation value (TPH) according to the following formula.

$$TPH=(Vd \cdot Id+Vq \cdot Iq-R \cdot Id^2-R \cdot Iq^2)/\omega e \qquad (5)$$

The second estimation part 136 calculates a second torque estimation value using the above second estimation method. For example, the second estimation part 136 calculates a second torque estimation value (TPL) according to the following formula.

$$TPL=\Phi \cdot Iq+(Ld-Lq) \cdot Id \cdot Iq \qquad (6)$$

The summing part 137 calculates the torque (TP) based on the torque estimation value (TPH) and the torque estimation value (TPL). For example, the summing part 137 calculates a weighted average value of the torque estimation value (TPH) and the torque estimation value (TPL) as the torque (TP).

As the rotational angular speed (ωe) approaches zero, accuracy of the torque estimation value (TPH) calculated with the rotational angular speed (ωe) as a denominator decreases. Therefore, the summing part 137 may gradually decrease the weight of the torque estimation value (TPH) and gradually increase the weight of the torque estimation value (TPL) as the rotational angular speed (ωe) approaches zero.

In the above, an example is illustrated in which the d-axis inductance (Ld) is set as a constant, the magnet magnetic flux (Φ) is estimated in real time according to the state of the motor 20, and the torque (TP) is calculated based on the d-axis inductance (Ld) and the magnet magnetic flux (Φ). Such an estimation method of the torque (TP) is effective for a motor in which fluctuation of the d-axis inductance (Ld) is relatively small as compared to fluctuation of the magnet magnetic flux (Φ). A specific example of such a motor 20 is an IPM motor.

Depending on the type of the motor 20, the fluctuation of the d-axis inductance (Ld) may be relatively large as compared to the fluctuation of the magnet magnetic flux (Φ). For example, in a synchronous reluctance motor that does not have a permanent magnet, the magnet magnetic flux (Φ) is zero and invariant, but the fluctuation in the d-axis inductance (Ld) is large. In order to address this, the control circuit 100 may further include a d-axis inductance estimation part 134.

The d-axis inductance estimation part 134 estimates a d-axis inductance based on a d-axis magnetic flux generated in the motor 20 and a d-axis current flowing in the motor 20. For example, the d-axis inductance estimation part 134 estimates a d-axis inductance (Ld) according to the following formula based on the d-axis magnetic flux (Φd) estimated by the magnetic flux estimation part 131, a constant magnet magnetic flux (Φ) (for example, zero), the d-axis current (Id) calculated by the current information acquisition part 121.

$$Ld=(\Phi d-\Phi)/Id \qquad (7)$$

As described above, the d-axis magnetic flux (Φd) represents a d-axis magnetic flux in the compensated dq coordinate system. The d-axis current (Id) represents a d-axis current in the compensated dq coordinate system. Therefore, the d-axis inductance estimation part 134 estimates the d-axis inductance (Ld) based on the d-axis magnetic flux, the magnet magnetic flux and the d-axis current in the compensated dq coordinate system.

According to the structure in which the d-axis inductance estimation part 134 is further provided, it is possible to select between an estimation mode, in which the drive force estimation part 123 estimates the torque (TP) based on the magnet magnetic flux (Φ) estimated by the magnet magnetic flux estimation part 132, and an estimation mode, in which the drive force estimation part 123 estimates the torque (TP) based on the d-axis inductance (Ld) estimated by the d-axis inductance estimation part 134. A structure for performing this selection is separately described later.

The d-axis inductance (Ld) estimated by the d-axis inductance estimation part 134 represents a d-axis inductance in the compensated dq coordinate system. Therefore, also in the case where the torque (TP) is estimated based on the d-axis inductance (Ld) estimated by the d-axis inductance estimation part 134, the drive force estimation part 123 estimates the torque (TP) based on information (the d-axis current (Id), the q-axis current (Iq), the d-axis inductance (Ld), and the q-axis inductance (Lq)) in the compensated dq coordinate system.

Figure 3:
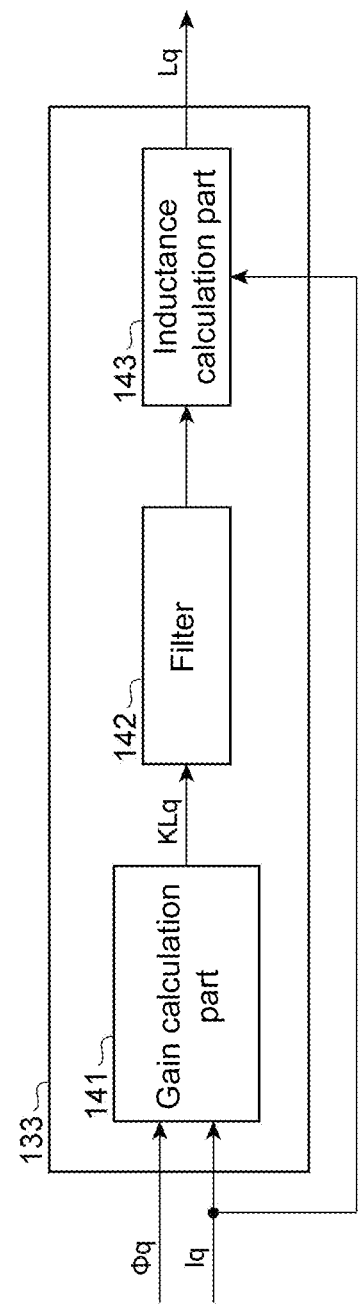
FIG. 3 is a block diagram illustrating a structure of a q-axis inductance estimation part.

The q-axis inductance estimation part 133 may be structured to estimate the q-axis inductance (Lq) by further subjecting the q-axis inductance (Lq) estimated based on the q-axis magnetic flux (Φq) and the q-axis current (Iq) to filter processing. For example, as illustrated in FIG. 3, the q-axis inductance estimation part 133 includes a gain calculation part 141, a filter 142, and an inductance calculation part 143.

The gain calculation part 141 calculates a q-axis inductance gain that represents a relationship between a q-axis inductance and a q-axis current based on a q-axis magnetic flux and the q-axis current. For example, the gain calculation part 141 calculates a q-axis inductance gain (KLq) according to the following formula based on the q-axis inductance (Lq) calculated according to the formula (4) and the q-axis current (Iq) calculated by the current information acquisition part 121.

$$KLq=(Lq-Lq0)/(|Iq|-Iq1) \qquad (8)$$

Lq0: constant
Iq1: constant

As shown in the formula (4), the q-axis inductance (Lq) is calculated based on the q-axis magnetic flux (Φq) estimated by the magnetic flux estimation part 131 and the q-axis current (Iq) calculated by the current information acquisition part 121. Therefore, that the q-axis inductance gain (KLq) is calculated according to the formula (8) is an example that the q-axis inductance gain (KLq) is calculated based on the q-axis magnetic flux (Φq) and the q-axis current (Iq).

The filter 142 reduces a noise component of the q-axis inductance gain (KLq), for example, by low-pass type digital filtering processing. The inductance calculation part 143 calculates the q-axis inductance (Lq) based on the q-axis inductance gain (KLq), which has passed through the filter 142, and the q-axis current (Iq). For example, the inductance calculation part 143 calculates the q-axis inductance (Lq) according to the following formula.

$$Lq=KLq(|Iq|-Iq1)+Lq0 \qquad (9)$$

Figure 4:
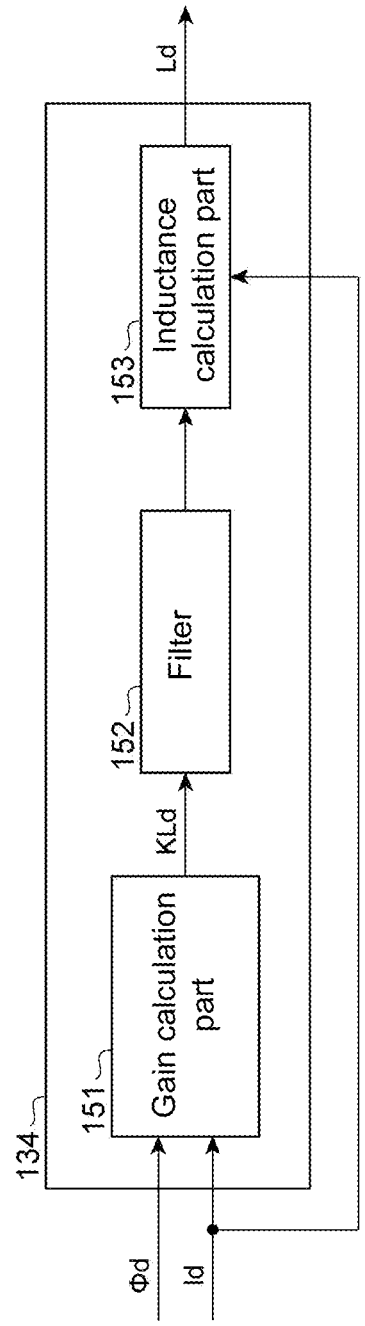
FIG. 4 is a block diagram illustrating a structure of a d-axis inductance estimation part.

The d-axis inductance estimation part 134 may be structured to estimate the d-axis inductance (Ld) by further subjecting the d-axis inductance (Ld) estimated based on the d-axis magnetic flux (Φd) and the d-axis current (Id) to filter processing. For example, as illustrated in FIG. 4, the d-axis inductance estimation part 134 includes a gain calculation part 151, a filter 152, and an inductance calculation part 153.

The gain calculation part 151 calculates a d-axis inductance gain that represents a relationship between a d-axis inductance and a d-axis current based on a d-axis magnetic flux and the d-axis current. For example, the gain calculation part 151 calculates a d-axis inductance gain (KLd) according to the following formula based on the d-axis inductance (Ld) calculated according to the formula (7) and the d-axis current (Id) calculated by the current information acquisition part 121.

$$KLd=(Ld-Ld0)/(|Id|-Id1) \quad (10)$$

Ld0: constant
Id1: constant

The filter 152 reduces a noise component of the d-axis inductance gain (KLd), for example, by low-pass type digital filtering processing. The inductance calculation part 153 calculates the d-axis inductance (Ld) based on the d-axis inductance gain (KLd), which has passed through the filter 152, and the d-axis current (Id). For example, the inductance calculation part 153 calculates the d-axis inductance (Ld) according to the following formula.

$$Ld=KLd(|Id|-Id1)+Ld0 \quad (11)$$

Axis Deviation Estimation Part

Figure 5:
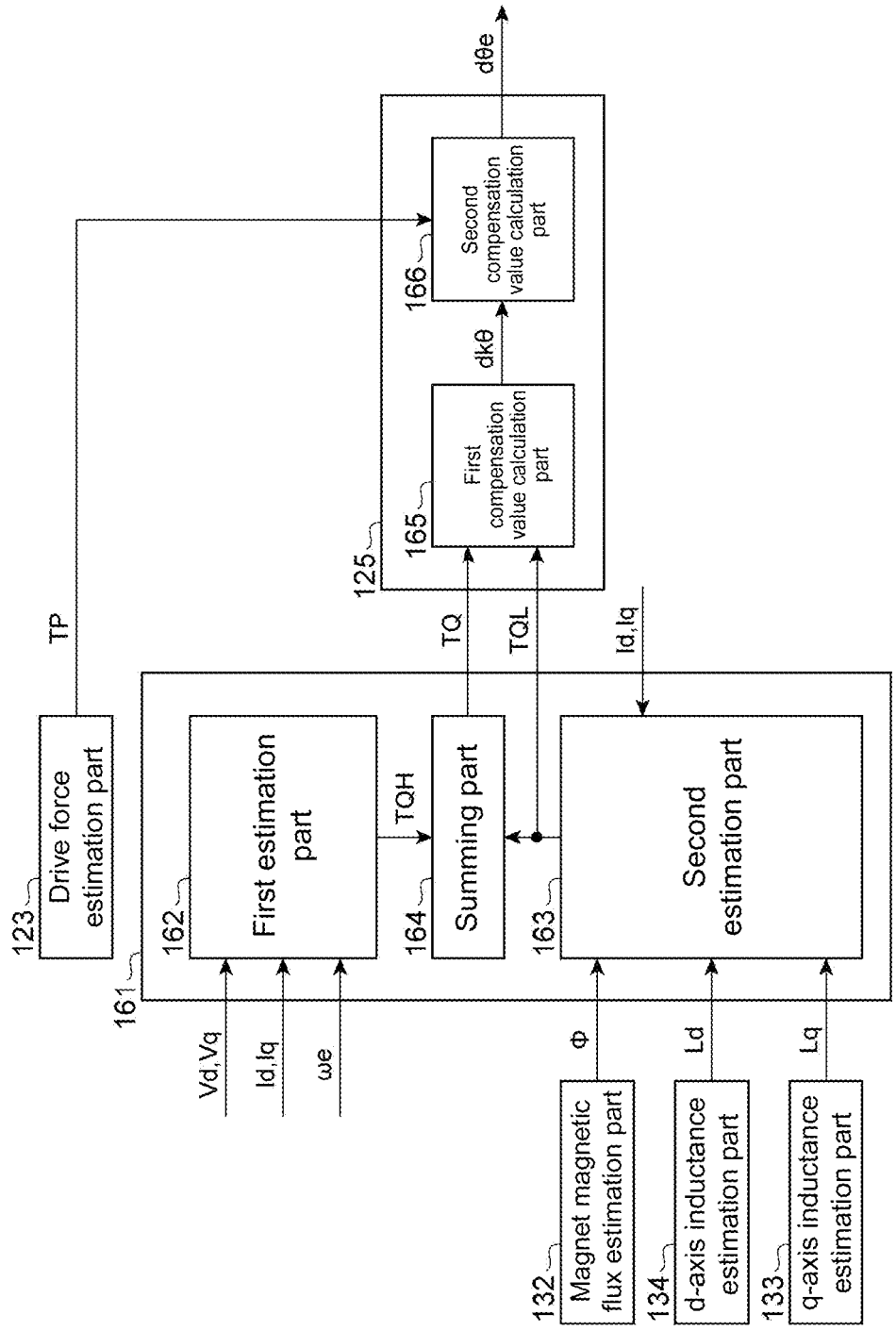
FIG. 5 is a block diagram illustrating a structure of an axis deviation estimation part.

Next, a structure of the axis deviation estimation part 125 is illustrated in more detail. The axis deviation estimation part 125 estimates the angular error of the dq coordinate system based on an inner product of a vector of the magnetic flux generated in the motor 20 and a vector of the current flowing in the motor 20 (hereinafter, this inner product is referred to as an "ineffective force"). The magnetic flux vector and the current vector may be expressed in the coordinate system, or may be expressed in a UVW three-phase coordinate system. For example, as illustrated in FIG. 5, the control circuit 100 further includes an ineffective force estimation part 161.

The ineffective force estimation part 161 estimates an ineffective force based on a voltage applied to the motor 20 (for example, a d-axis voltage and a q-axis voltage), and a current flowing in the motor 20 in response to the application of voltage (for example, a d-axis current and a q-axis current). For example, the ineffective force estimation part 161 estimates an ineffective force based on the d-axis voltage (Vd) and the q-axis voltage (Vq), which are calculated by the voltage correction part 126, and the d-axis current (Id) and the q-axis current (Iq), which are calculated by the current information acquisition part 121. For example, the ineffective force estimation part 161 includes a first estimation part 162, a second estimation part 163, and a summing part 164.

The first estimation part 162 estimates an ineffective force based on a d-axis voltage, a q-axis voltage, a d-axis current, a q-axis current and an operating speed of the motor 20. For example, the first estimation part 162 calculates a first ineffective force estimation value (TQH) according to the following formula based on the d-axis voltage (Vd) and the q-axis voltage (Vq), which are calculated by the voltage correction part 126, the d-axis current (Id) and the q-axis current (Iq), which are calculated by the current information acquisition part 121, and the rotational angular speed (ωe) of the motor 20.

$$TQH=(Vd \cdot Id - Vq \cdot Iq)/\omega e \quad (12)$$

The second estimation part 163 estimates an ineffective force based on an estimation result of the magnet magnetic flux estimation part 132, a d-axis current, a q-axis current, a d-axis inductance and a q-axis inductance. For example, the second estimation part 163 calculates a second ineffective force estimation value (TQL) according to the following formula based on the magnet magnetic flux (Φ) estimated by the magnet magnetic flux estimation part 132, the d-axis current (Id) and the q-axis current (Iq), which are calculated by the current information acquisition part 121, the constant d-axis inductance (Ld), and the q-axis inductance (Lq) estimated by the q-axis inductance estimation part 133.

$$TQL=\Phi \cdot Id + Ld \cdot Id^2 + Lq \cdot Iq^2 \quad (13)$$

The summing part 164 calculates an ineffective force (TQ) based on the ineffective force estimation value (TQH) and the ineffective force estimation value (TQL). For example, the summing part 164 calculates a weighted average value of the ineffective force estimation value (TQH) and the ineffective force estimation value (TQL) as the ineffective force (TQ). As the rotational angular speed (ωe) approaches zero, accuracy of the ineffective force estimation value (TQH) calculated with the rotational angular speed (ωe) as a denominator decreases. Therefore, the summing part 164 may gradually decrease the weight of the ineffective force estimation value (TQH) and gradually increase the weight of the ineffective force estimation value (TQL) as the rotational angular speed (ωe) approaches zero.

According to the structure in which the control circuit 100 further includes the d-axis inductance estimation part 134, it is possible to select between an estimation mode, in which the ineffective force estimation part 161 estimates the ineffective force (TQ) based on the magnet magnetic flux (Φ) estimated by the magnet magnetic flux estimation part 132, and an estimation mode, in which the ineffective force estimation part 161 estimates the ineffective force (TQ) based on the d-axis inductance (Ld) estimated by the d-axis inductance estimation part 134. A structure for performing this selection is separately described later.

The axis deviation estimation part 125 calculates the angular error (dθe) based on an estimation result of the ineffective force estimation part 161. For example, the axis deviation estimation part 125 calculates the angular error (dθe) based on an estimation result of the first estimation part 162 and an estimation result of the second estimation part 163. For example, the axis deviation estimation part 125 calculates the angular error (dθe) based on a difference between the ineffective force (TQ) calculated by the summing part 164 and the ineffective force estimation value (TQL) calculated by the second estimation part 163. The axis deviation estimation part 125 may calculate the angular error (dθe) based on a difference between the ineffective force estimation value (TQH) calculated by the first estimation part 162 and the ineffective force estimation value (TQL) calculated by the second estimation part 163.

The axis deviation estimation part 125 may calculate the angular error (dθe) further based on the torque (TP). For example, the axis deviation estimation part 125 includes a first compensation value calculation part 165 and a second compensation value calculation part 166. The first compensation value calculation part 165 calculates an angular error (dkθ) based on the ineffective force estimation value (TQH) and the ineffective force estimation value (TQL). For example, the first compensation value calculation part 165 calculates the angular error (dkθ) by subjecting a difference between the ineffective force (TQ) and the ineffective force estimation value (TQL) to proportional calculation, proportional and integral calculation, and the like. The second compensation value calculation part 166 calculates the angular error (dθe) by multiplying the angular error (dkθ) by a coefficient proportional to the torque (TP).

Switching of Estimation Method

Figure 6:
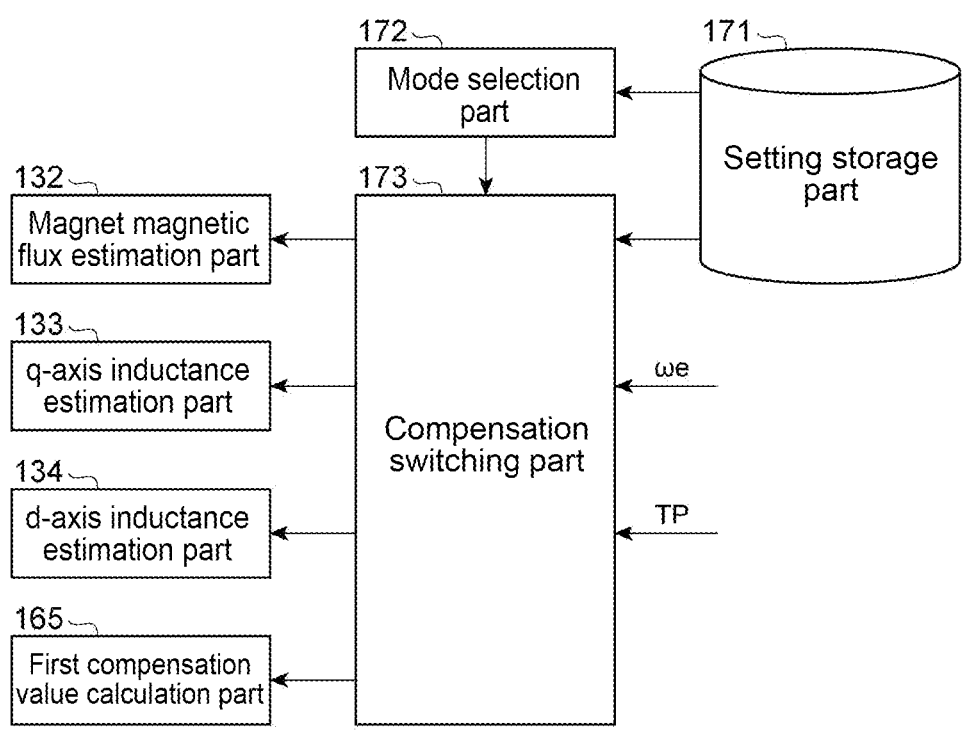
FIG. 6 is a block diagram illustrating a compensation switching part.

The control circuit 100 may be structured to change the estimation mode of the torque (TP) based on a type of the motor 20 and an operation state of the motor 20. For example, as illustrated in FIG. 6, the control circuit 100 includes a setting storage part 171, a mode selection part 172, and a compensation switching part 173. The setting storage part 171 stores a setting value of the type of the motor 20. This setting value is acquired, for example, from a user interface.

The mode selection part 172 changes the estimation mode of the torque (TP) based on the type of the motor 20 stored in the setting storage part 171. For example, based on the type of the motor 20, the mode selection part 172 selects one of an estimation mode (first estimation mode), in which the magnet magnetic flux estimation part 132 estimates a magnet magnetic flux, and an estimation mode (second estimation mode), in which the d-axis inductance estimation part 134 estimates a d-axis inductance. For example, the mode selection part 172 selects an SPM mode (first estimation mode) when the motor 20 is an SPM motor, selects an IPM mode (first estimation mode) when the motor 20 is an IPM motor, and selects an RM mode when the motor 20 is a synchronous reluctance motor (RM motor).

The SPM mode is a mode in which the magnet magnetic flux estimation part 132 estimates a magnet magnetic flux, the axis deviation estimation part 125 estimates an angular error, the q-axis inductance estimation part 133 does not estimate a q-axis inductance, and the d-axis inductance estimation part 134 does not estimate a d-axis inductance. When the mode selection part 172 selects the SPM mode, the drive force estimation part 123 estimates the torque (TP) based on the magnet magnetic flux estimated by the magnet magnetic flux estimation part 132 and the angular error estimated by the axis deviation estimation part 125. The ineffective force estimation part 161 estimates the ineffective force (TQ) based on the magnet magnetic flux estimated by the magnet magnetic flux estimation part 132 and the angular error estimated by the axis deviation estimation part 125.

The IPM mode is a mode in which the magnet magnetic flux estimation part 132 estimates a magnet magnetic flux, the axis deviation estimation part 125 estimates an angular error, the q-axis inductance estimation part 133 estimates a q-axis inductance, and the d-axis inductance estimation part 134 does not estimate a d-axis inductance. When the mode selection part 172 selects the IPM mode, the drive force estimation part 123 estimates the torque (TP) based on the magnet magnetic flux estimated by the magnet magnetic flux estimation part 132, the angular error estimated by the axis deviation estimation part 125, and the q-axis inductance estimated by the q-axis inductance estimation part 133. The ineffective force estimation part 161 estimates the ineffective force (TQ) based on the magnet magnetic flux estimated by the magnet magnetic flux estimation part 132, the angular error estimated by the axis deviation estimation part 125, and the q-axis inductance estimated by the q-axis inductance estimation part 133.

The RM mode is a mode in which the magnet magnetic flux estimation part 132 does not estimate a magnet magnetic flux, the axis deviation estimation part 125 estimates an angular error, the q-axis inductance estimation part 133 estimates a q-axis inductance, and the d-axis inductance estimation part 134 estimates a d-axis inductance. When the mode selection part 172 selects the RM mode, the drive force estimation part 123 estimates the torque (TP) based on the angular error estimated by the axis deviation estimation part 125, the q-axis inductance estimated by the q-axis inductance estimation part 133, and the d-axis inductance estimated by the d-axis inductance estimation part 134. The ineffective force estimation part 161 estimates the ineffective force (TQ) based on the angular error estimated by the axis deviation estimation part 125, the q-axis inductance estimated by the q-axis inductance estimation part 133, and the d-axis inductance estimated by the d-axis inductance estimation part 134.

Based on the state of the motor 20, the compensation switching part 173 switches between validating and invalidating each of the magnet magnetic flux estimation by the magnet magnetic flux estimation part 132, the angular error estimation by the axis deviation estimation part 125, the q-axis inductance estimation by the q-axis inductance estimation part 133, and the d-axis inductance estimation by the d-axis inductance estimation part 134. The validating means that the estimation is continued. The invalidating means that the estimation is interrupted and an estimation result is kept as a constant value. For example, when the rotational angular speed (ωe) of the motor 20 is below a predetermined speed threshold, the compensation switching part 173 invalidates the estimation of the magnet magnetic flux by the magnet magnetic flux estimation part 132.

When the mode selection part 172 selects the SPM mode, the compensation switching part 173 switches between validating and invalidating the magnet magnetic flux estimation by the magnet magnetic flux estimation part 132 and the angular error estimation by the axis deviation estimation part 125. When the rotational angular speed (ωe) of the motor 20 is below a predetermined speed threshold, the compensation switching part 173 invalidates the estimation of the magnet magnetic flux by the magnet magnetic flux estimation part 132. As a result, the magnet magnetic flux estimation part 132 interrupts the estimation of the magnet magnetic flux and keeps the magnet magnetic flux constant. When the rotational angular speed (ωe) of the motor 20 is below a predetermined speed threshold, the compensation switching part 173 invalidates the estimation of the angular error (dkθ) by the first compensation value calculation part 165. As a result, the axis deviation estimation part 125 interrupts the estimation of the angular error (dkθ) and keeps the angular error constant.

When the mode selection part 172 selects the IPM mode, the compensation switching part 173 switches between validating and invalidating the magnet magnetic flux estimation by the magnet magnetic flux estimation part 132, the angular error estimation by the axis deviation estimation part 125, and the q-axis inductance estimation by the q-axis inductance estimation part 133. When the rotational angular speed (ωe) of the motor 20 is below a predetermined speed threshold, the compensation switching part 173 invalidates the estimation of the magnet magnetic flux by the magnet magnetic flux estimation part 132. As a result, the magnet magnetic flux estimation part 132 interrupts the estimation of the magnet magnetic flux and keeps the magnet magnetic flux constant. When the rotational angular speed (ωe) of the motor 20 is below a predetermined speed threshold, the compensation switching part 173 invalidates the estimation of the angular error (dkθ) by the first compensation value calculation part 165. As a result, the axis deviation estimation part 125 interrupts the estimation of the angular error (dkθ) and keeps the angular error (dkθ) constant. When the torque (TP) is below a predetermined torque threshold (force threshold), the compensation switching part 173 invalidates the estimation of the q-axis inductance by the q-axis inductance estimation part 133. As a result, the q-axis inductance estimation part 133 interrupts the estimation of the q-axis inductance and keeps the q-axis inductance constant.

When the mode selection part 172 selects the RM mode, the compensation switching part 173 switches between validating and invalidating the angular error estimation by the axis deviation estimation part 125, the q-axis inductance estimation by the q-axis inductance estimation part 133, and the d-axis inductance estimation by the d-axis inductance estimation part 134. When the rotational angular speed ($\omega e$) of the motor 20 is below a predetermined speed threshold, the compensation switching part 173 invalidates the estimation of the angular error (dk$\theta$) by the first compensation value calculation part 165. As a result, the axis deviation estimation part 125 interrupts the estimation of the angular error (dk$\theta$) and keeps the angular error (dk$\theta$) constant. When the torque (TP) is below a predetermined torque threshold (force threshold), the compensation switching part 173 invalidates the estimation of the q-axis inductance by the q-axis inductance estimation part 133. As a result, the q-axis inductance estimation part 133 interrupts the estimation of the q-axis inductance and keeps the q-axis inductance constant.

In the above, the functional components of the control circuit 100 are illustrated. However, since the functional blocks are structural elements of the control circuit 100, processing contents executed by the functional blocks correspond to processing contents executed by the control circuit 100.

Figure 7:
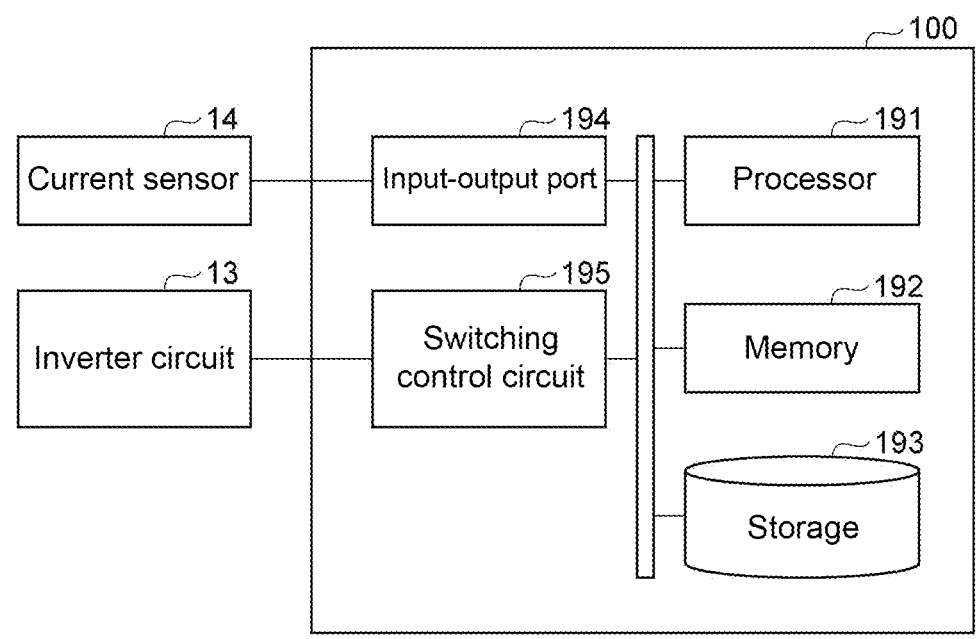
FIG. 7 is a block diagram illustrating a hardware structure of a control circuit.

FIG. 7 is a schematic diagram illustrating a hardware structure of the control circuit 100. As illustrated in FIG. 7, the control circuit 100 includes at least one processor 191, a memory 192, a storage 193, an input-output port 194, and a switching control circuit 195. The storage 193 has a computer-readable storage medium, such as a non-volatile semiconductor memory. The storage 193 stores a program that causes the power conversion device 1 to execute a power conversion method that includes: estimating a magnet magnetic flux of the motor 20 based on a d-axis magnetic flux generated in the motor 20, a d-axis inductance of the motor 20, and a d-axis current flowing in the motor 20; estimating a q-axis inductance of the motor 20 based on a q-axis magnetic flux generated in the motor 20 and a q-axis current flowing in the motor 20; estimating a drive force of the motor 20 based on an estimation result of the magnet magnetic flux and an estimation result of the q-axis inductance; and correcting a current command such that an estimation result of the drive force follows a drive force command. For example, the storage 193 stores a program for forming the above-described functional blocks in the control circuit 100.

The memory 192 temporarily stores a program loaded from the storage medium of the storage 193 and a calculation result of the processor 191. The processor 191 forms the functional blocks of the control circuit 100 by executing the above program in cooperation with the memory 192. The input-output port 194 performs input or output of an electric signal to or from the current sensor 14 according to a command from the processor 191. The switching control circuit 195 outputs the above drive power to the motor 20 by switching the multiple switching elements 15 in the inverter circuit 13 on or off according to a command from the processor 191.

The control circuit 100 is not necessarily limited to a circuit that uses a program to achieve the functions. For example, the control circuit 100 may use a dedicated logic circuit or an ASIC (Application Specific Integrated Circuit) that integrates the logic circuit to achieve at least some of the functions.

Power Conversion Procedure

Next, as an example of the power conversion method, a control procedure of the power conversion circuit 10 executed by the control circuit 100 is illustrated. This procedure includes: estimating a magnet magnetic flux of the motor 20 based on a d-axis magnetic flux generated in the motor 20, a d-axis inductance of the motor 20, and a d-axis current flowing in the motor 20; estimating a q-axis inductance of the motor 20 based on a q-axis magnetic flux generated in the motor 20, and a q-axis current flowing in the motor 20; estimating a drive force of the motor 20 based on an estimation result of the magnet magnetic flux and an estimation result of the q-axis inductance; and correcting a current command such that the estimation result of the drive force follows a drive force command. In the following, the control procedure is illustrated in detail by dividing it into an estimation mode selection procedure and a voltage control procedure.

Estimation Mode Selection Procedure

Figure 8:
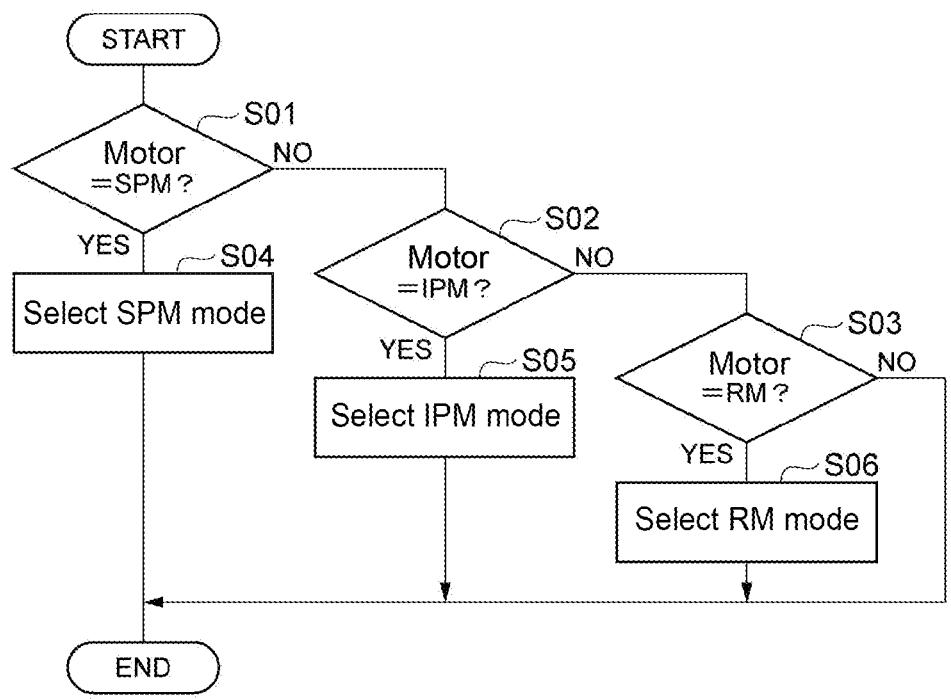
FIG. 8 is a flowchart illustrating a mode selection procedure.

As illustrated in FIG. 8, the control circuit 100 first executes Step S01. In Step S01, the mode selection part 172 confirms whether or not the type of the motor 20 stored in the setting storage part 171 is an SPM motor. When it is determined in Step S01 that the type of the motor 20 is not an SPM motor, the control circuit 100 executes Step S02. In Step S02, the mode selection part 172 confirms whether or not the type of the motor 20 stored in the setting storage part 171 is an IPM motor. When it is determined in Step S02 that the type of the motor 20 is not an IPM motor, the control circuit 100 executes Step S03. In Step S03, the mode selection part 172 confirms whether or not the type of the motor 20 stored in the setting storage part 171 is an RM motor.

When it is determined in Step S01 that the type of the motor 20 is an SPM motor, the control circuit 100 executes Step S04. In Step S04, the mode selection part 172 selects the SPM mode. When it is determined in Step S02 that the type of the motor 20 is an IPM motor, the control circuit 100 executes Step S05. In Step S05, the mode selection part 172 selects the IPM mode. When it is determined in Step S03 that the type of the motor 20 is an RM motor, the control circuit 100 executes Step S06. In Step S06, the mode selection part 172 selects the RM mode. When it is determined in Step S03 that the type of the motor 20 is not an RM motor, the control circuit 100 does not execute any of Steps S04, S05, and S06. As a result, the selection procedure is completed.

Voltage Control Procedure

Figure 9:
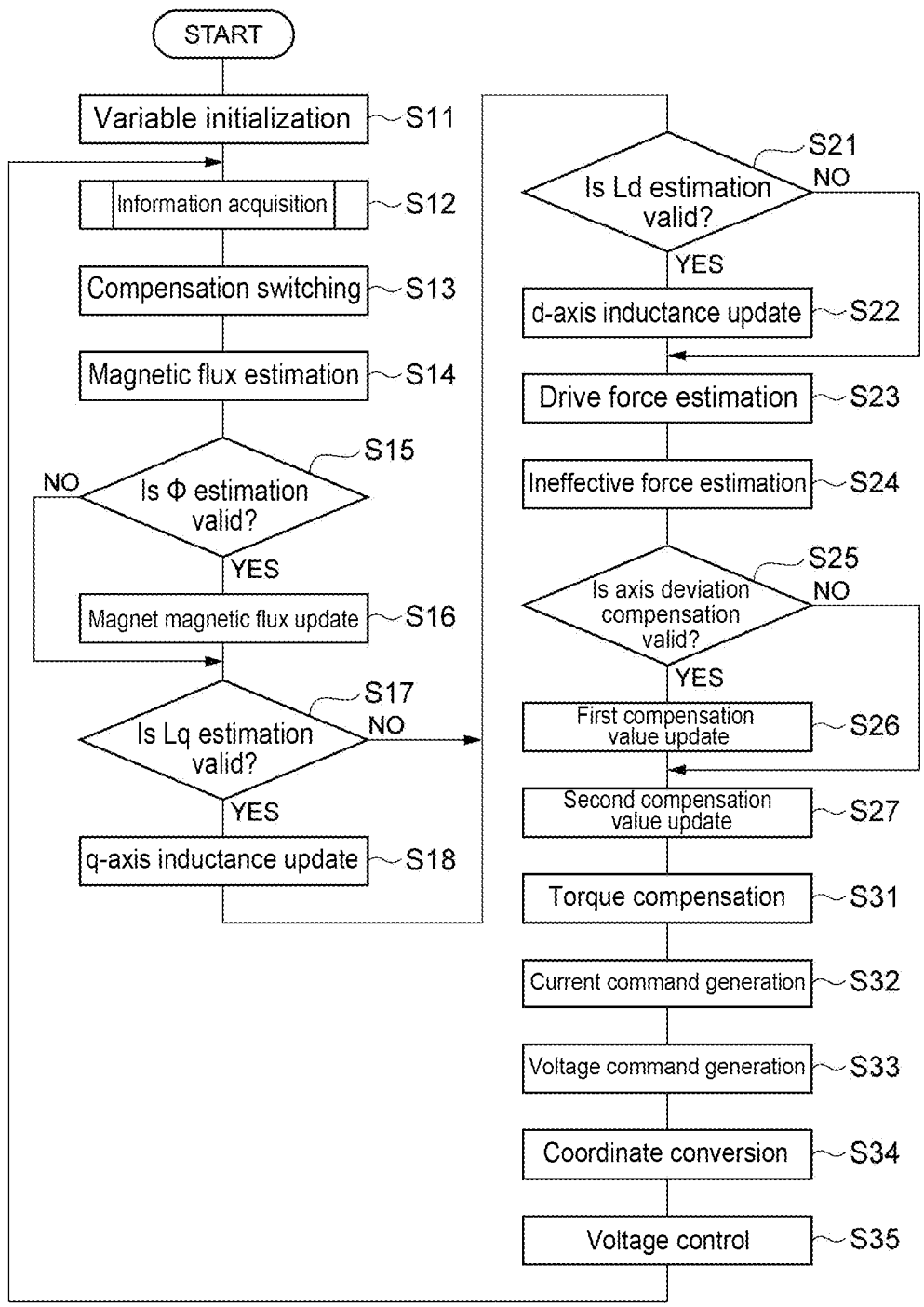
FIG. 9 is a flowchart illustrating a power conversion control procedure.

As illustrated in FIG. 9, the control circuit 100 first executes Steps S11, S12, S13, S14, and S15. In Step S11, the drive force estimation part 123 sets an estimation value of the torque (TP) to an initial value (for example, zero). Further, the voltage command generation part 112 sets the d-axis voltage command (Vd*) and the q-axis voltage command (Vq*) to initial values (for example, zero). In Step S12, the current information acquisition part 121 acquires a detection result by the current sensor 14 and calculates the d-axis current (Id) and the q-axis current (Iq). Further, the axis position estimation part 122 estimates the rotation angle ($\theta e$) of the dq coordinate system based on a relationship between the d-axis voltage command (Vd*) and q-axis voltage command (Vq*) and the d-axis current (Id) and q-axis current (Iq). Further, the voltage correction part 126 calculates the d-axis voltage (Vd) and the q-axis voltage (Vq) based on the rotational angular speed (ωe), the d-axis voltage command (Vd*) and the q-axis voltage command (Vq*).

In Step S13, based on the state of the motor 20 (for example, the rotational angular speed (ωe) and the torque (TP)), the compensation switching part 173 switches between validating and invalidating each of the magnet magnetic flux estimation by the magnet magnetic flux estimation part 132, the angular error estimation by the axis deviation estimation part 125, the q-axis inductance estimation by the q-axis inductance estimation part 133, and the d-axis inductance estimation by the d-axis inductance estimation part 134. A specific switching procedure differs depending on the above estimation mode. The procedure of Step S13 will be described later for each estimation mode.

In Step S14, the magnetic flux estimation part 131 calculates the d-axis magnetic flux (Φd) and the q-axis magnetic flux (Φq) based the d-axis voltage (Vd) and the q-axis voltage (Vq), which are calculated by the voltage correction part 126, and the d-axis current (Id) and the q-axis current (Iq), which are calculated by the current information acquisition part 121. In Step S15, the magnet magnetic flux estimation part 132 confirms whether or not the magnet magnetic flux estimation is valid.

When it is determined in Step S15 that the magnet magnetic flux estimation is valid, the control circuit 100 executes Step S16. In Step S16, the magnet magnetic flux estimation part 132 estimates the magnet magnetic flux (Φ) based on the d-axis magnetic flux (Φd) estimated by the magnetic flux estimation part 131, the constant d-axis inductance (Ld), and the d-axis current (Id) calculated by the current information acquisition part 121.

Next, the control circuit 100 executes Step S17. When it is determined in Step S15 that the magnetic flux estimation is not valid, the control circuit 100 executes Step S17 without executing Step S16. In Step S17, the q-axis inductance estimation part 133 confirms whether or not the q-axis inductance estimation is valid.

When it is determined in Step S17 that the q-axis inductance estimation is valid, the control circuit 100 executes Step S18. In Step S18, the q-axis inductance estimation part 133 estimates the q-axis inductance (Lq) based on the q-axis magnetic flux (Φq) estimated by the magnetic flux estimation part 131 and the q-axis current (Iq) calculated by current information acquisition part 121.

Next, the control circuit 100 executes Step S21. When it is determined in Step S17 that the q-axis inductance estimation is not valid, the control circuit 100 executes Step S21 without executing Step S18. In Step S21, the d-axis inductance estimation part 134 confirms whether or not the d-axis inductance estimation is valid.

When it is determined in Step S21 that the d-axis inductance estimation is valid, the control circuit 100 executes Step S22. In Step S22, the d-axis inductance estimation part 134 estimates the d-axis inductance (Ld) based on the d-axis magnetic flux (Φd) estimated by the magnetic flux estimation part 131, the constant magnet magnetic flux (Φ) (for example, zero), and the d-axis current (Id) calculated by the current information acquisition part 121.

Next, the control circuit 100 executes Step S23. When it is determined in Step S21 that the d-axis inductance estimation is not valid, the control circuit 100 executes Step S23 without executing Step S22. In Step S23, the drive force estimation part 123 estimates the torque (TP) based on the d-axis current (Id), the q-axis current (Iq), the d-axis voltage (Vd), the q-axis voltage (Vq), the rotational angular speed (ωe), the magnet magnetic flux (Φ), the q-axis inductance (Lq), and the d-axis inductance (Ld).

Next, the control circuit 100 executes Steps S24 and S25. In Step S24, the ineffective force estimation part 161 estimates the ineffective force (TQ) based on the d-axis current (Id), the q-axis current (Iq), the d-axis voltage (Vd), the q-axis voltage (Vq), the rotational angular speed (ωe), the magnet magnetic flux (Φ), the q-axis inductance (Lq), and the d-axis inductance (Ld). In Step S25, the axis deviation estimation part 125 confirms whether or not the angular error estimation is valid.

When it is determined in Step S25 that the angular error estimation is valid, the control circuit 100 executes Step S26. In Step S26, the first compensation value calculation part 165 calculates the angular error (dkθ) based on a difference between the ineffective force (TQ) calculated by the summing part 164 and the ineffective force estimation value (TQL) calculated by the second estimation part 163.

Next, the control circuit 100 executes Step S27. When it is determined in Step S25 that the angular error estimation is not valid, the control circuit 100 executes Step S27 without executing Step S26. In Step S27, the second compensation value calculation part 166 calculates the angular error (dθe) by multiplying the angular error (dkθ) by a coefficient proportional to the torque (TP).

Next, the control circuit 100 executes Steps S31, S32, S33, S34, and S35. In Step S31, the drive force compensation part 124 calculates the correction torque command (T**) such that a deviation between the torque (TP) estimated by the drive force estimation part 123 and the torque command (T*) is reduced.

In Step S32, the current command generation part 111 calculates the d-axis current command (Id*) and the q-axis current command (Iq*) based on the correction torque command (T**). In Step S33, the voltage command generation part 112 calculates the d-axis voltage command (Vd*) and the q-axis voltage command (Vq*) based on the d-axis current command (Id*), the q-axis current command (Iq*), the d-axis current (Id), and the q-axis current (Iq) such that a deviation between the d-axis current command (Id*) and the d-axis current (Id) is reduced and a deviation between the q-axis current command (Iq*) and the q-axis current (Iq) is reduced.

In Step S34, the coordinate conversion part 113 calculates the u-phase voltage command (Vu*), the v-phase voltage command (Vv*) and the w-phase voltage command (Vw*) by performing coordinate conversion from the dq coordinate system to the αβ coordinate system and conversion from two phases to three phases with respect to the d-axis voltage command (Vd*) and the q-axis voltage command (Vq*). In Step 35, the PWM control part 114 switches the multiple switching elements 15 of the inverter circuit 13 on or off such that a drive voltage according to the u-phase voltage command (Vu*), the v-phase voltage command (Vv*) and the w-phase voltage command (Vw*) is applied to the motor 20. For example, the PWM control part 114 calculates a voltage pulse for each phase according to the u-phase voltage command (Vu*), the v-phase voltage command (Vv*), and the w-phase voltage command (Vw*), and switches the multiple switching elements 15 on or off such that the voltage pulse for each phase is generated. After that, the control circuit 100 returns the process to Step S12. After that, the procedures of Step S12 and after are repeated. The control circuit 100 may calculate a voltage pulse in the dq coordinate system or the αβ coordinate system and convert the voltage pulse into the above voltage pulse for each phase.

Figure 10:
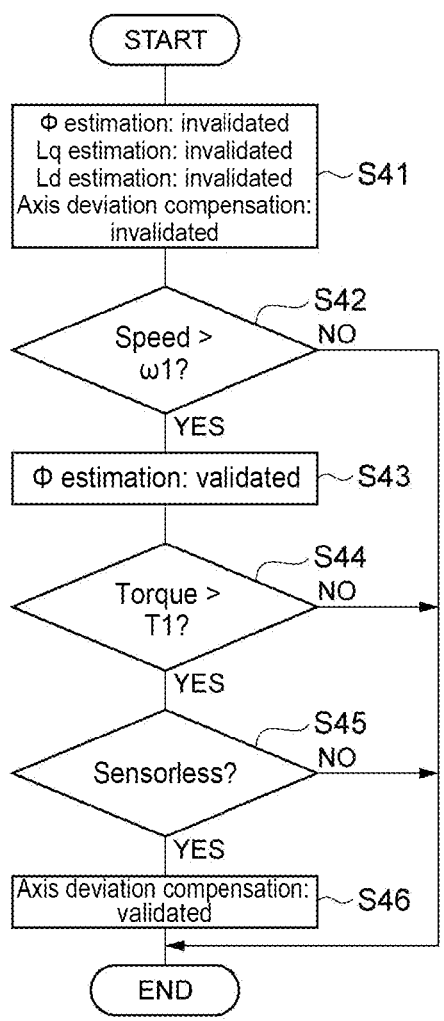
FIG. 10 is a flowchart illustrating a compensation switching procedure in an SPM mode.

FIG. 10 is a flowchart illustrating the procedure executed in Step 13 when the SPM mode is selected. As illustrated in FIG. 10, the control circuit 100 first executes Steps S41 and S42. In Step S41, the compensation switching part 173 invalidates all of the magnet magnetic flux estimation by the magnet magnetic flux estimation part 132, the angular error estimation by the axis deviation estimation part 125, the q-axis inductance estimation by the q-axis inductance estimation part 133, and the d-axis inductance estimation by the d-axis inductance estimation part 134. In Step S42, the compensation switching part 173 confirms whether or not the rotational angular speed (ωe) exceeds a predetermined speed threshold (ω1).

When it is determined in Step S42 that the rotational angular speed (ωe) exceeds the speed threshold (ω1), the control circuit 100 executes Step S43. In Step S43, the compensation switching part 173 validates the magnet magnetic flux estimation by the magnet magnetic flux estimation part 132. Next, the control circuit 100 executes Step S44. In Step S44, the compensation switching part 173 confirms whether or not the torque (TP) exceeds a predetermined torque threshold (T1).

When it is determined in Step S44 that the torque (TP) exceeds the torque threshold (T1), the control circuit 100 executes Step S45. In Step S45, the compensation switching part 173 confirms whether or not the motor 20 is speed-sensorless (does not have a speed sensor).

When it is determined in Step S45 that the motor 20 is speed-sensorless, the control circuit 100 executes Step S46. In Step S46, the compensation switching part 173 validates the angular error estimation by the axis deviation estimation part 125.

When it is determined in Step S42 that the rotational angular speed (ωe) does not exceed the speed threshold (ω1), the control circuit 100 does not execute any of Steps S43 and S46. Therefore, the magnet magnetic flux estimation, the angular error estimation, the q-axis inductance estimation, and the d-axis inductance estimation are all kept invalid.

When it is determined in Step S44 that the torque (TP) does not exceed the torque threshold (T1), or when it is determined in Step S45 that the motor 20 is not speed-sensorless, the control circuit 100 does not execute Step S46. Therefore, only the magnet magnetic flux estimation is validated. As a result, the compensation switching procedure in the case where the SPM mode is selected is completed.

Figure 11:
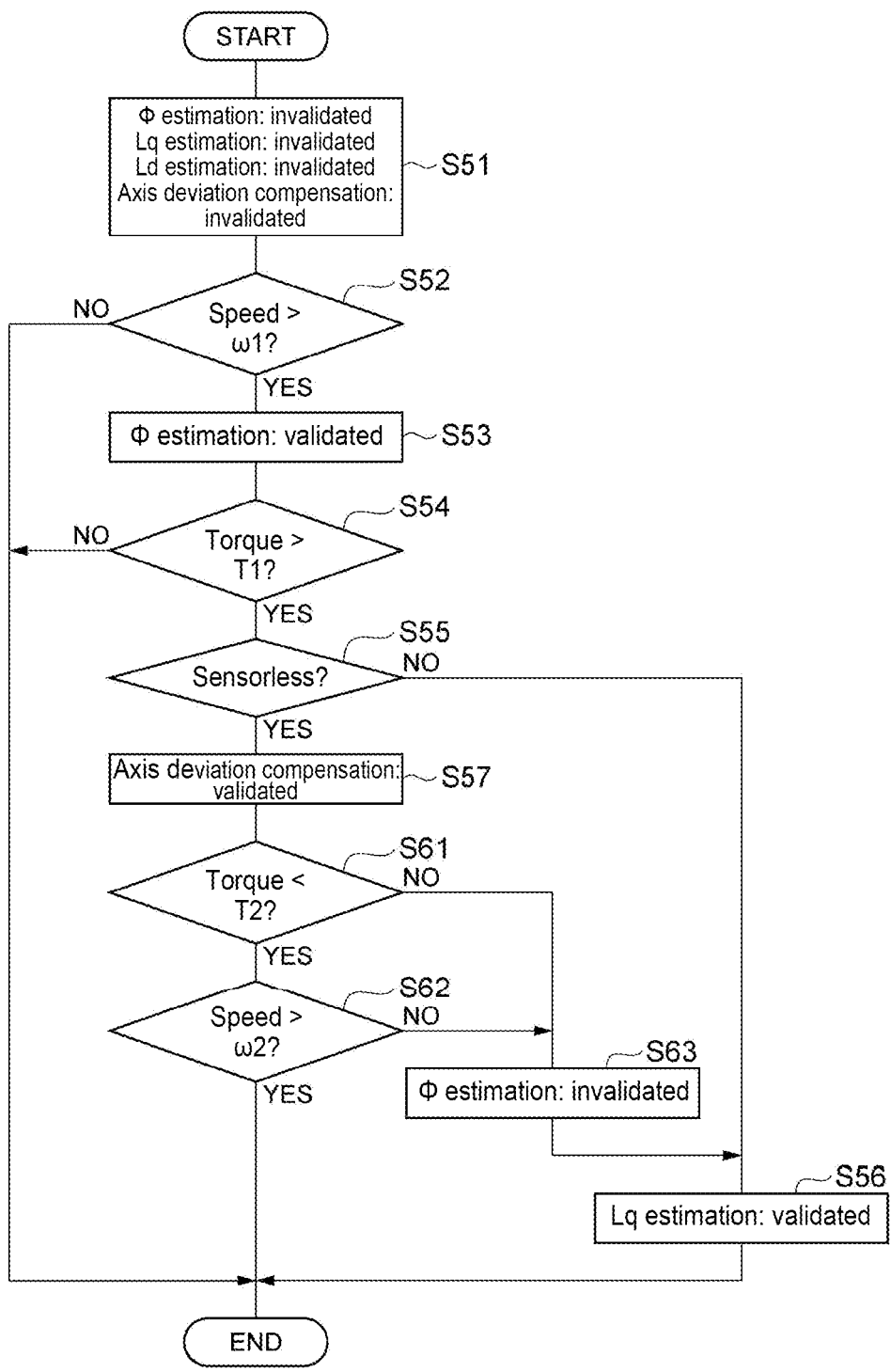
FIG. 11 is a flowchart illustrating a compensation switching procedure in an IPM mode.

FIG. 11 is a flowchart illustrating the procedure executed in Step 13 when the IPM mode is selected. As illustrated in FIG. 11, the control circuit 100 first executes Steps S51 and S52. In Step S51, the compensation switching part 173 invalidates all of the magnet magnetic flux estimation by the magnet magnetic flux estimation part 132, the angular error estimation by the axis deviation estimation part 125, the q-axis inductance estimation by the q-axis inductance estimation part 133, and the d-axis inductance estimation by the d-axis inductance estimation part 134. In Step S52, the compensation switching part 173 confirms whether or not the rotational angular speed (ωe) exceeds the predetermined speed threshold (ω1).

When it is determined in Step S52 that the rotational angular speed (ωe) exceeds the speed threshold (ω1), the control circuit 100 executes Step S53. In Step S53, the compensation switching part 173 validates the magnet magnetic flux estimation by the magnet magnetic flux estimation part 132.

Next, the control circuit 100 executes Step S54. In Step S54, the compensation switching part 173 confirms whether or not the torque (TP) exceeds the predetermined torque threshold (T1).

When it is determined in Step S54 that the torque (TP) exceeds the torque threshold (T1), the control circuit 100 executes Step S55. In Step S55, the compensation switching part 173 confirms whether or not the motor 20 is speed-sensorless.

When it is determined in Step S55 that the motor 20 is not speed-sensorless, the control circuit 100 executes Step S56. In Step S56, the compensation switching part 173 validates the q-axis inductance estimation by the q-axis inductance estimation part 133. As a result, a state is achieved in which the magnet magnetic flux estimation and the q-axis inductance estimation are validated.

When it is determined in Step S55 that the motor 20 is speed-sensorless, the control circuit 100 executes Step S57. In Step S57, the compensation switching part 173 validates the angular error estimation by the axis deviation estimation part 125.

Next, the control circuit 100 executes Step S61. In Step S61, the compensation switching part 173 confirms whether or not the torque (TP) is greater than the above torque threshold (T1) and less than a predetermined torque threshold (T2).

When it is determined in Step S61 that the torque (TP) is less that the torque threshold (T2), the control circuit 100 executes Step S62. In Step S62, the compensation switching part 173 confirms whether or not the rotational angular speed (ωe) is greater than the above speed threshold (ω1) and less than a predetermined speed threshold (ω2).

When it is determined in Step S61 that the torque (TP) is not less than the torque threshold (T2), or when it is determined in Step S62 that the rotational angular speed (ωe) is not less than the speed threshold (ω2), the control circuit 100 executes Step S63. In Step S63, the compensation switching part 173 invalidates the magnet magnetic flux estimation by the magnet magnetic flux estimation part 132. After that, the control circuit 100 advances the process to Step S56 described above. As a result, the q-axis inductance estimation is validated instead of the magnet magnetic flux estimation, and a state is achieved in which the angular error estimation and the q-axis inductance estimation are validated.

When it is determined in Step S52 that the rotational angular speed (ωe) does not exceed the speed threshold (ω1), the control circuit 100 does not execute any of Steps S53, S56, S57, and S63. Therefore, the magnet magnetic flux estimation, the angular error estimation, the q-axis inductance estimation, and the d-axis inductance estimation are all kept invalid.

When it is determined in Step S54 that the torque (TP) does not exceed the torque threshold (T1), the control circuit 100 does not execute Steps S56, S57, and S63. Therefore, only the magnet magnetic flux estimation is validated. As a result, the compensation switching procedure in the case where the IPM mode is selected is completed.

Figure 12:
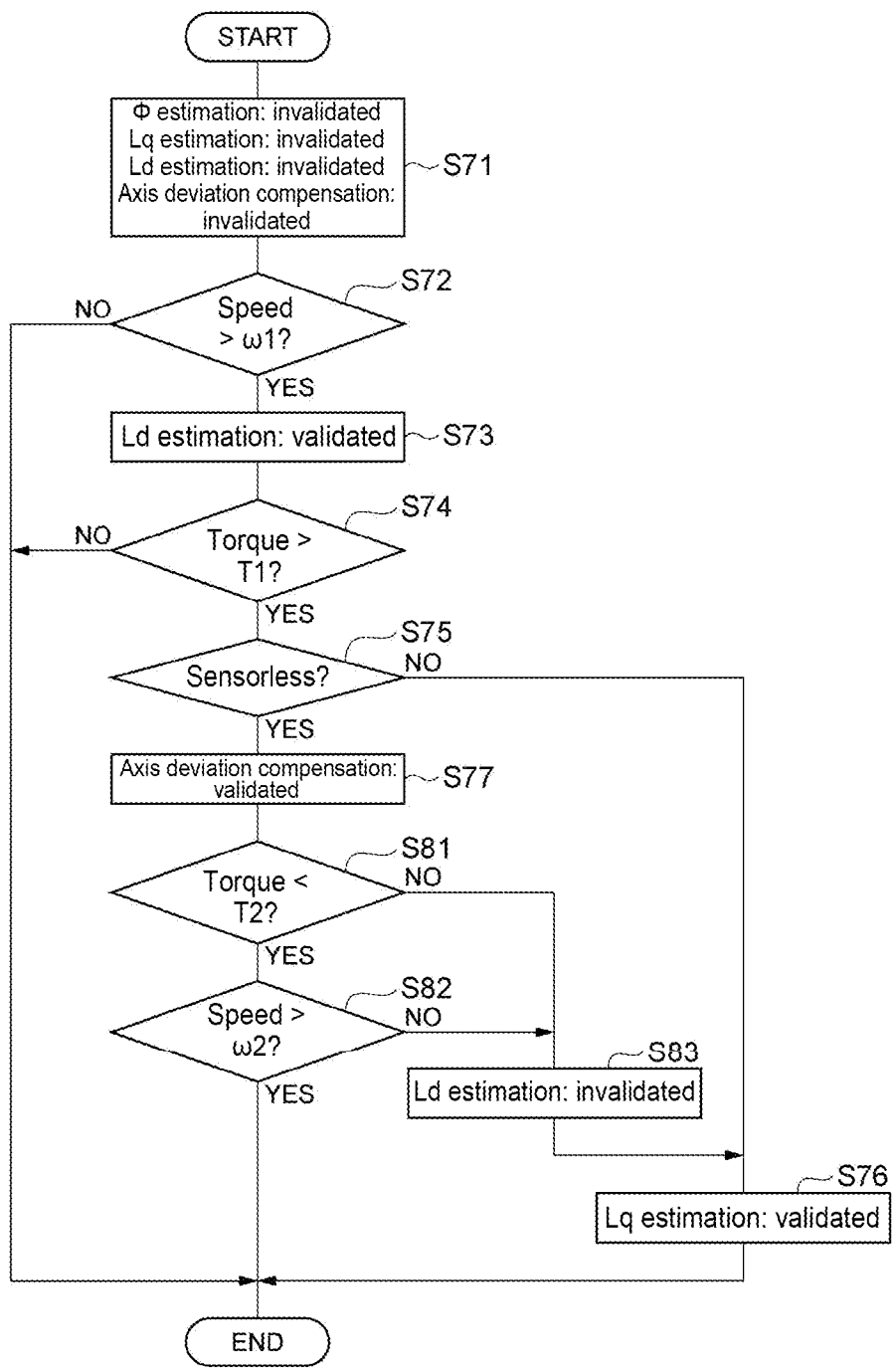
FIG. 12 is a flowchart illustrating a compensation switching procedure in an RM mode.

FIG. 12 is a flowchart illustrating the procedure executed in Step 13 when the RM mode is selected. As illustrated in FIG. 12, the control circuit 100 first executes Steps S71 and S72. In Step S71, the compensation switching part 173 invalidates all of the magnet magnetic flux estimation by the magnet magnetic flux estimation part 132, the angular error estimation by the axis deviation estimation part 125, the q-axis inductance estimation by the q-axis inductance estimation part 133, and the d-axis inductance estimation by the d-axis inductance estimation part 134. In Step S72, the compensation switching part 173 confirms whether or not the rotational angular speed ($\omega e$) exceeds the predetermined speed threshold ($\omega 1$).

When it is determined in Step S72 that the rotational angular speed ($\omega e$) exceeds the speed threshold ($\omega 1$), the control circuit 100 executes Step S73. In Step S73, the compensation switching part 173 validates the d-axis inductance estimation by the d-axis inductance estimation part 134.

Next, the control circuit 100 executes Step S74. In Step S74, the compensation switching part 173 confirms whether or not the torque (TP) exceeds the predetermined torque threshold (T1).

When it is determined in Step S74 that the torque (TP) exceeds the torque threshold (T1), the control circuit 100 executes Step S75. In Step S75, the compensation switching part 173 confirms whether or not the motor 20 is speed-sensorless.

When it is determined in Step S75 that the motor 20 is not speed-sensorless, the control circuit 100 executes Step S76. In Step S76, the compensation switching part 173 validates the q-axis inductance estimation by the q-axis inductance estimation part 133. As a result, a state is achieved in which the d-axis inductance estimation and the q-axis inductance estimation are validated.

When it is determined in Step S75 that the motor 20 is speed-sensorless, the control circuit 100 executes Step S77. In Step S77, the compensation switching part 173 validates the angular error estimation by the axis deviation estimation part 125.

Next, the control circuit 100 executes Step S81. In Step S81, the compensation switching part 173 confirms whether or not the torque (TP) is greater than the above torque threshold (T1) and less than the predetermined torque threshold (T2). When it is determined in Step S81 that the torque (TP) is less that the torque threshold (T2), the control circuit 100 executes Step S82. In Step S82, the compensation switching part 173 confirms whether or not the rotational angular speed ($\omega e$) is greater than the above speed threshold ($\omega 1$) and less than the predetermined speed threshold ($\omega 2$).

When it is determined in Step S81 that the torque (TP) is not less than the torque threshold (T2), or when it is determined in Step S82 that the rotational angular speed ($\omega e$) is not less than the speed threshold ($\omega 2$), the control circuit 100 executes Step S83. In Step S83, the compensation switching part 173 invalidates the d-axis inductance estimation by the d-axis inductance estimation part 134. After that, the control circuit 100 advances the process to Step S76 described above. As a result, the q-axis inductance estimation is validated instead of the d-axis inductance estimation, and a state is achieved in which the angular error estimation and the q-axis inductance estimation are validated.

When it is determined in Step S72 that the rotational angular speed ($\omega e$) does not exceed the speed threshold ($\omega 1$), the control circuit 100 does not execute any of Steps S73, S76, S77, and S83. Therefore, the magnet magnetic flux estimation, the angular error estimation, the q-axis inductance estimation, and the d-axis inductance estimation are all kept invalid.

When it is determined in Step S74 that the torque (TP) does not exceed the torque threshold (T1), the control circuit 100 does not execute Steps S76, S77, and S83. Therefore, only the d-axis inductance estimation is validated. As a result, the compensation switching procedure in the case where the RM mode is selected is completed.

In each of the compensation switching procedures, the number of estimation targets is always kept to two or less. As a result, easy estimation based on two types of equations, including a d-axis side equation and a q-axis side equation, is enabled.

As described above, the power conversion device 1 includes: the magnet magnetic flux estimation part 132 that estimates the magnet magnetic flux of the motor 20 based on the d-axis magnetic flux generated in the motor 20, the d-axis inductance of the motor 20, and the d-axis current flowing in the motor 20; the q-axis inductance estimation part 133 that estimates the q-axis inductance of the motor 20 based on the q-axis magnetic flux generated in the motor 20 and the q-axis current flowing in the motor 20; the drive force estimation part 123 that estimates the drive force of the motor 20 based on the estimation result by the magnet magnetic flux estimation part 132 and the estimation result by the q-axis inductance estimation part 133; and the drive force compensation part 124 that corrects the current command such that the estimation result by the drive force estimation part 123 follows the drive force command.

According to this power conversion device 1, the magnet magnetic flux and the q-axis inductance, which tend to fluctuate depending on the state of the motor 20, are estimated based on the current state of the motor 20, the drive force is estimated based on the estimation result, and the current command is corrected such that the estimation result of the drive force follows the drive force command. Therefore, it is effective in improving accuracy of drive force control of the motor 20.

The q-axis inductance estimation part 133 may include: the gain calculation part 141 that calculates the q-axis inductance gain, which represents a relationship between the q-axis inductance and the q-axis current, based on the q-axis magnetic flux and the q-axis current; the filter 142 that reduces a noise component of the q-axis inductance gain; and the inductance calculation part 143 that calculates the q-axis inductance based on the q-axis inductance gain, which has passed through the filter 142, and the q-axis current. In this case, it is possible to achieve both an estimation sensitivity of the q-axis inductance and noise reduction in the estimation result of the q-axis inductance. Therefore, it is effective in further improving the accuracy of the drive force control of the motor 20.

The power conversion device 1 may further include the axis deviation estimation part 125 that estimates the angular error of the dq coordinate system based on the d-axis voltage and the q-axis voltage, which are applied to the motor 20, and the d-axis current and the q-axis current, which flow in the motor 20 in response to the application of the d-axis voltage and the q-axis voltage, and the drive force estimation part 123 may estimate the drive force of the motor 20 further based on the angular error of the dq coordinate system. In this case, the angular error of the dq coordinate system is calculated based on the current state of the motor 20, and the drive force of the motor 20 is estimated further based on the angular error. Therefore, it is effective in further improving the accuracy of the drive force control of the motor 20.

The magnet magnetic flux estimation part 132 may estimate the magnet magnetic flux based on the d-axis magnetic flux, the d-axis inductance and the d-axis current in the dq coordinate system that has been corrected based on the angular error; the q-axis inductance estimation part 133 may estimate the q-axis inductance based on the q-axis magnetic flux and the q-axis current in the dq coordinate system that has been corrected based on the angular error; and the drive force estimation part 123 may estimate the drive force based on the d-axis current and the q-axis current in the dq coordinate system that has been corrected based on the angular error, the estimation result by the magnet magnetic flux estimation part 132, and the estimation result by the q-axis inductance estimation part 133. In this case, based on the angular error, estimation accuracy of the magnet magnetic flux, estimation accuracy of the q-axis inductance, and estimation accuracy of the drive force are each improved. Therefore, it is effective in further improving the accuracy of the drive force control of the motor 20.

The power conversion device 1 may further include the ineffective force estimation part 161 that estimates the ineffective force, which is the inner product of the magnetic flux vector including the d-axis magnetic flux and the q-axis magnetic flux and the current vector including the d-axis current and the q-axis current, based on the d-axis voltage, the q-axis voltage, the d-axis current, and the q-axis current, and the axis deviation estimation part 125 may calculate the angular error based on the estimation result of the ineffective force estimation part 161. An inflection point between a current phase and a drive force may be positioned in a range of the current phase in a normal power operation. When the inflection point is included in the range of the current phase, it is difficult to determine whether an angular error occurs in a positive direction or a negative direction. On the other hand, an inflection point in a relationship between a current phase and an ineffective force tends to be positioned outside a range of the current phase in a normal power operation. Therefore, the angular error can be more easily calculated based on an ineffective force than based on a drive force.

The ineffective force estimation part 161 may include: the first estimation part 162 that estimates the ineffective force based on the d-axis voltage, the q-axis voltage, the d-axis current, the q-axis current and the operating speed of the motor 20; and the second estimation part 163 that estimates the ineffective force based on the estimation result by the magnet magnetic flux estimation part 132, the d-axis current, the q-axis current, the d-axis inductance and the q-axis inductance, and the axis deviation estimation part 125 may calculate the angular error based on the estimation result by the first estimation part 162 and the estimation result by the second estimation part 163. The angular error is unlikely to affect the estimation result by the first estimation part 162, and is likely to affect the estimation result by the second estimation part 163. Therefore, a difference between the estimation result by the first estimation part 162 and the estimation result by the second estimation part 163 tends to correlate with the angular error. Therefore, the angular error can be easily calculated based on the difference between the estimation result by the first estimation part 162 and the estimation result by the second estimation part 163.

The power conversion device 1 may further include the magnetic flux estimation part 131 that estimates the d-axis magnetic flux and the q-axis magnetic flux based on the d-axis voltage and the q-axis voltage, which are applied to the motor 20, the d-axis current and the q-axis current, which flow in the motor 20 in response to the application of the d-axis voltage and the q-axis voltage, and the operating speed of the motor 20. The magnet magnetic flux estimation part 132 may estimate the magnet magnetic flux based on the d-axis magnetic flux estimated by the magnetic flux estimation part 131. The q-axis inductance estimation part 133 may estimate the q-axis inductance based on the q-axis magnetic flux estimated by the magnetic flux estimation part 131. When the operating speed of the motor 20 is below a predetermined speed threshold, the magnet magnetic flux estimation part 132 may interrupt the estimation of the magnet magnetic flux and keep the estimation result of the magnet magnetic flux constant. As the speed of the motor 20 decreases, estimation accuracy of the d-axis magnetic flux and the q-axis magnetic flux tends to decrease. On the other hand, when the operating speed of the motor 20 is below the predetermined speed threshold, the magnetic flux estimation part 131 interrupts the estimation of the d-axis magnetic flux and the q-axis magnetic flux and keeps the estimation results of the d-axis magnetic flux and the q-axis magnetic flux constant. As a result, the decrease in the estimation accuracy of the drive force due to the decrease in the operating speed of the motor 20 is suppressed.

When the operating speed of the motor 20 is below the predetermined threshold, the axis deviation estimation part 125 may interrupt the estimation of the angular error and keep the angular error constant. As the speed of the motor 20 decreases, accuracy of the angular error tends to decrease. On the other hand, when the operating speed of the motor 20 is below the predetermined speed threshold, the axis deviation estimation part 125 interrupts the estimation of the angular error and keeps the angular error (dkθ) constant. As a result, the decrease in the estimation accuracy of the drive force due to the decrease in the operating speed of the motor 20 is suppressed.

When the estimation result by the drive force estimation part 123 is below the predetermined force threshold, the q-axis inductance estimation part 133 may interrupt the estimation of the q-axis inductance and keep the estimation result of the q-axis inductance constant. As the q-axis current decreases, the estimation accuracy of the q-axis inductance tends to decrease. On the other hand, when the q-axis current is below a predetermined current threshold, the magnetic flux estimation part 131 interrupts the estimation of q-axis inductance and keeps the estimation result of the q-axis inductance constant. As a result, the decrease in the estimation accuracy of the drive force due to the decrease in the q-axis current is suppressed.

The power conversion device 1 may further include: the d-axis inductance estimation part 134 that estimates the d-axis inductance based on the d-axis magnetic flux and the d-axis current; and the mode selection part 172 that selects, based on the type of the motor 20, one of the first estimation mode, in which the magnet magnetic flux estimation part 132 estimates the magnet magnetic flux, and the second estimation mode, in which the d-axis inductance estimation part 134 estimates the d-axis inductance. When the mode selection part 172 selects the first estimation mode, the drive force estimation part 123 may estimate the drive force of the motor 20 based on the estimation result by the magnet magnetic flux estimation part 132 and the estimation result by the q-axis inductance estimation part 133. When the mode selection part 172 selects the second estimation mode, the drive force estimation part 123 may estimate the drive force of the motor 20 based on the estimation result by the d-axis inductance estimation part 134 and the estimation result by the q-axis inductance estimation part 133. Ease of occurrence of fluctuation in the magnet magnetic flux according to the state of the motor 20 differs depending on the state of the motor 20. Further, there is a tendency that, in a motor 20 in which fluctuation in magnet magnetic flux is likely to occur, fluctuation in d-axis inductance is unlikely to occur, and, in a motor 20 in which fluctuation in magnet magnetic flux is unlikely to occur, fluctuation in d-axis inductance is likely to occur. Therefore, by switching between the first estimation mode and the second estimation mode based on the type of the motor 20, the estimation accuracy of the drive force can be further improved for each type of the motor 20.

When the motor 20 is a reluctance motor, the mode selection part 172 may select the second estimation mode. In this case, switching between the first estimation mode and the second estimation mode can be more appropriately performed.

The d-axis inductance estimation part 134 may include: the gain calculation part 151 that calculates the d-axis inductance gain, which represents a relationship between the d-axis inductance and the d-axis current, based on the d-axis magnetic flux and the d-axis current; the filter 152 that reduces a noise component of the d-axis inductance gain; and the inductance calculation part 153 that calculates the d-axis inductance based on the d-axis inductance gain, which has passed through the filter, and the d-axis current. In this case, it is possible to achieve both an estimation sensitivity of the d-axis inductance and noise reduction in the estimation result of the d-axis inductance. Therefore, it is effective in further improving the accuracy of the drive force control of the motor 20.

A power conversion device according to an embodiment of the present invention includes: a magnet magnetic flux estimation part that estimates a magnet magnetic flux of an electric motor based on a d-axis magnetic flux generated in the electric motor, a d-axis inductance of the electric motor, and a d-axis current flowing in the electric motor; a q-axis inductance estimation part that estimates a q-axis inductance of the electric motor based on a q-axis magnetic flux generated in the electric motor and a q-axis current flowing in the electric motor; a drive force estimation part that estimates a drive force of the electric motor based on an estimation result by the magnet magnetic flux estimation part and an estimation result by the q-axis inductance estimation part; and a drive force compensation part that corrects a current command such that an estimation result by the drive force estimation part follows a drive force command.

A power conversion method according to another aspect of the present disclosure includes: estimating a magnet magnetic flux of an electric motor based on a d-axis magnetic flux generated in the electric motor, a d-axis inductance of the electric motor, and a d-axis current flowing in the electric motor; estimating a q-axis inductance of the electric motor based on a q-axis magnetic flux generated in the electric motor and a q-axis current flowing in the electric motor; estimating a drive force of the electric motor based on an estimation result of the magnet magnetic flux and an estimation result of the q-axis inductance; and correcting a current command such that an estimation result of the drive force follows a drive force command.

A program according to yet another aspect of the present disclosure causes a device to execute a power conversion method that includes: estimating a magnet magnetic flux of an electric motor based on a d-axis magnetic flux generated in the electric motor, a d-axis inductance of the electric motor, and a d-axis current flowing in the electric motor; estimating a q-axis inductance of the electric motor based on a q-axis magnetic flux generated in the electric motor and a q-axis current flowing in the electric motor; estimating a drive force of the electric motor based on an estimation result of the magnet magnetic flux and an estimation result of the q-axis inductance; and correcting a current command such that an estimation result of the drive force follows a drive force command.

A power conversion device according to an embodiment of the present invention is effective in improving accuracy of drive force control of an electric motor.

Obviously, numerous modifications and variations of the present invention are possible in light of the above teachings. It is therefore to be understood that within the scope of the appended claims, the invention may be practiced otherwise than as specifically described herein.

What is claimed is:

1. A power conversion device, comprising:
processing circuitry configured to estimate a magnet magnetic flux of an electric motor based on a d-axis magnetic flux generated in the electric motor, a d-axis inductance of the electric motor, and a d-axis current flowing in the electric motor, estimate a q-axis inductance of the electric motor based on a q-axis magnetic flux generated in the electric motor and a q-axis current flowing in the electric motor, estimate a drive force of the electric motor based on the magnet magnetic flux and the q-axis inductance, and correct a current command such that the drive force follows a drive force command.

2. The power conversion device according to claim 1, further comprising:
a filter that reduces a noise component of a q-axis inductance gain,
wherein the processing circuitry is further configured to estimate the q-axis inductance by being further configured to calculate the q-axis inductance gain, which represents a relationship between the q-axis inductance and the q-axis current, based on the q-axis magnetic flux and the q-axis current, and calculate the q-axis inductance based on the q-axis inductance gain, which has passed through the filter, and the q-axis current.

3. The power conversion device according to claim 2, wherein the processing circuitry is further configured to estimate an angular error of a dq coordinate system based on a d-axis voltage and a q-axis voltage, which are applied to the electric motor, and a d-axis current and a q-axis current, which flow in the electric motor in response to application of the d-axis voltage and the q-axis voltage, and the processing circuitry is further configured to estimate the drive force of the electric motor based on the angular error of the dq coordinate system.

4. The power conversion device according to claim 2, wherein the processing circuitry is further configured to estimate the d-axis magnetic flux and the q-axis magnetic flux based on a d-axis voltage and a q-axis voltage, which are applied to the electric motor, and a d-axis current and a q-axis current, which flow in the electric motor in response to application of the d-axis voltage and the q-axis voltage, and an operating speed of the electric motor, estimate the magnet magnetic flux based on the d-axis magnetic flux, estimate the q-axis inductance based on the q-axis magnetic flux, and when the operating speed of the electric motor is below a predetermined speed threshold, interrupt the estimation of the magnet magnetic flux and keep the magnet magnetic flux constant.

5. The power conversion device according to claim 1, wherein the processing circuitry is further configured to estimate an angular error of a dq coordinate system based on a d-axis voltage and a q-axis voltage, which are applied to the electric motor, and a d-axis current and a q-axis current, which flow in the electric motor in response to application of the d-axis voltage and the q-axis voltage, and the processing circuitry is further configured to estimate the drive force of the electric motor based on the angular error of the dq coordinate system.

6. The power conversion device according to claim 5, wherein the processing circuitry is further configured to estimate the magnet magnetic flux based on the d-axis magnetic flux, the d-axis inductance, and the d-axis current in the dq coordinate system that has been corrected based on the angular error, estimate the q-axis inductance based on the q-axis magnetic flux and the q-axis current in the dq coordinate system that has been corrected based on the angular error, and estimate the drive force based on the d-axis current and the q-axis current in the dq coordinate system that has been corrected based on the angular error, the magnet magnetic flux, and the q-axis inductance.

7. The power conversion device according to claim 6, wherein the processing circuitry is further configured to estimate an ineffective force, which is an inner product of a magnetic flux vector including the d-axis magnetic flux and the q-axis magnetic flux and a current vector including the d-axis current and the q-axis current, based on the d-axis voltage, the q-axis voltage, the d-axis current, and the q-axis current, and calculate the angular error based on the ineffective force.

8. The power conversion device according to claim 5, wherein the processing circuitry is further configured to estimate an ineffective force, which is an inner product of a magnetic flux vector including the d-axis magnetic flux and the q-axis magnetic flux and a current vector including the d-axis current and the q-axis current, based on the d-axis voltage, the q-axis voltage, the d-axis current, and the q-axis current, and calculate the angular error based on the ineffective force.

9. The power conversion device according to claim 8, wherein the processing circuitry is further configured to estimate a first estimated force of the ineffective force based on the d-axis voltage, the q-axis voltage, the d-axis current, the q-axis current, and an operating speed of the electric motor, estimate a second estimated force of the ineffective force based on the magnet magnetic flux, the d-axis current, the q-axis current, the d-axis inductance, and the q-axis inductance, and calculate the angular error based on the first and second estimated forces of the ineffective force.

10. The power conversion device according to claim 9, wherein when the operating speed of the electric motor is below a predetermined threshold, the processing circuitry is further configured to interrupt the calculation of the angular error and keep the angular error constant.

11. The power conversion device according to claim 5, wherein the processing circuitry is further configured to estimate the d-axis magnetic flux and the q-axis magnetic flux based on a d-axis voltage and a q-axis voltage, which are applied to the electric motor, and a d-axis current and a q-axis current, which flow in the electric motor in response to the application of the d-axis voltage and the q-axis voltage, and an operating speed of the electric motor, estimate the magnet magnetic flux based on the d-axis magnetic flux, estimate the q-axis inductance based on the q-axis magnetic flux, and when the operating speed of the electric motor is below a predetermined speed threshold, interrupt the estimation of the magnet magnetic flux and keep the magnet magnetic flux constant.

12. The power conversion device according to claim 1, wherein the processing circuitry is further configured to estimate the d-axis magnetic flux and the q-axis magnetic flux based on a d-axis voltage and a q-axis voltage, which are applied to the electric motor, and a d-axis current and a q-axis current, which flow in the electric motor in response to application of the d-axis voltage and the q-axis voltage, and an operating speed of the electric motor, estimate the magnet magnetic flux based on the d-axis magnetic flux, estimate the q-axis inductance based on the q-axis magnetic flux, and when the operating speed of the electric motor is below a predetermined speed threshold, interrupt the estimation of the magnet magnetic flux and keep the magnet magnetic flux constant.

13. The power conversion device according to claim 1, wherein when the drive force is below a predetermined force threshold, the processing circuitry is further configured to interrupt the estimation of the q-axis inductance and keep the q-axis inductance constant.

14. The power conversion device according to claim 1, wherein the processing circuitry is further configured to estimate the d-axis inductance based on the d-axis magnetic flux and the d-axis current, select, based on a type of the electric motor, one of a first estimation mode, in which the magnet magnetic flux is estimated, and a second estimation mode, in which the d-axis inductance is estimated, the processing circuitry is further configured to estimate the drive force of the electric motor based on the magnet magnetic flux and the q-axis inductance, when the first estimation mode is selected, and the processing circuitry is further configured to estimate the drive force of the electric motor based on the estimated d-axis inductance and the estimated q-axis inductance, when the second estimation mode is selected.

15. The power conversion device according to claim 14, wherein when the electric motor is a reluctance motor, the second estimation mode is selected.

16. The power conversion device according to claim 15, further comprising:
a filter that reduces a noise component of a d-axis inductance gain,
wherein the processing circuitry is further configured to calculate the d-axis inductance gain, which represents a relationship between the d-axis inductance and the d-axis current, based on the d-axis magnetic flux and the d-axis current, and calculate the d-axis inductance based on the d-axis inductance gain, which has passed through the filter, and the d-axis current.

17. A power conversion device, comprising:
processing circuitry configured to estimate an ineffective force, which is an inner product of a vector of a magnetic flux generated in an electric motor and a vector of a current flowing in the electric motor, based on a voltage applied to the electric motor and the current flowing in the electric motor in response to application of the voltage, calculate an angular error of a dq coordinate system based on the ineffective force, estimate a drive force of the electric motor based on the angular error, and correct a current command such that the drive force follows a drive force command.

18. A power conversion device, comprising:
processing circuitry configured to estimate a d-axis inductance of an electric motor based on a d-axis magnetic flux generated in the electric motor and a d-axis current flowing in the electric motor, estimate a q-axis inductance of the electric motor based on a q-axis magnetic flux generated in the electric motor and a q-axis current flowing in the electric motor, estimate a drive force of the electric motor based on the d-axis inductance and the q-axis inductance, and correct a current command such that the drive force follows a drive force command.

19. A power conversion method, comprising:
- estimating a magnet magnetic flux of an electric motor based on a d-axis magnetic flux generated in the electric motor, a d-axis inductance of the electric motor, and a d-axis current flowing in the electric motor;
- estimating a q-axis inductance of the electric motor based on a q-axis magnetic flux generated in the electric motor and a q-axis current flowing in the electric motor;
- estimating a drive force of the electric motor based on the magnet magnetic flux and the q-axis inductance; and
- correcting a current command such that the drive force follows a drive force command.

20. A non-transitory computer readable medium having stored thereon a program that when executed by a computer causes the computer to implement the power conversion method of claim 19.

* * * * *